Figure 1:
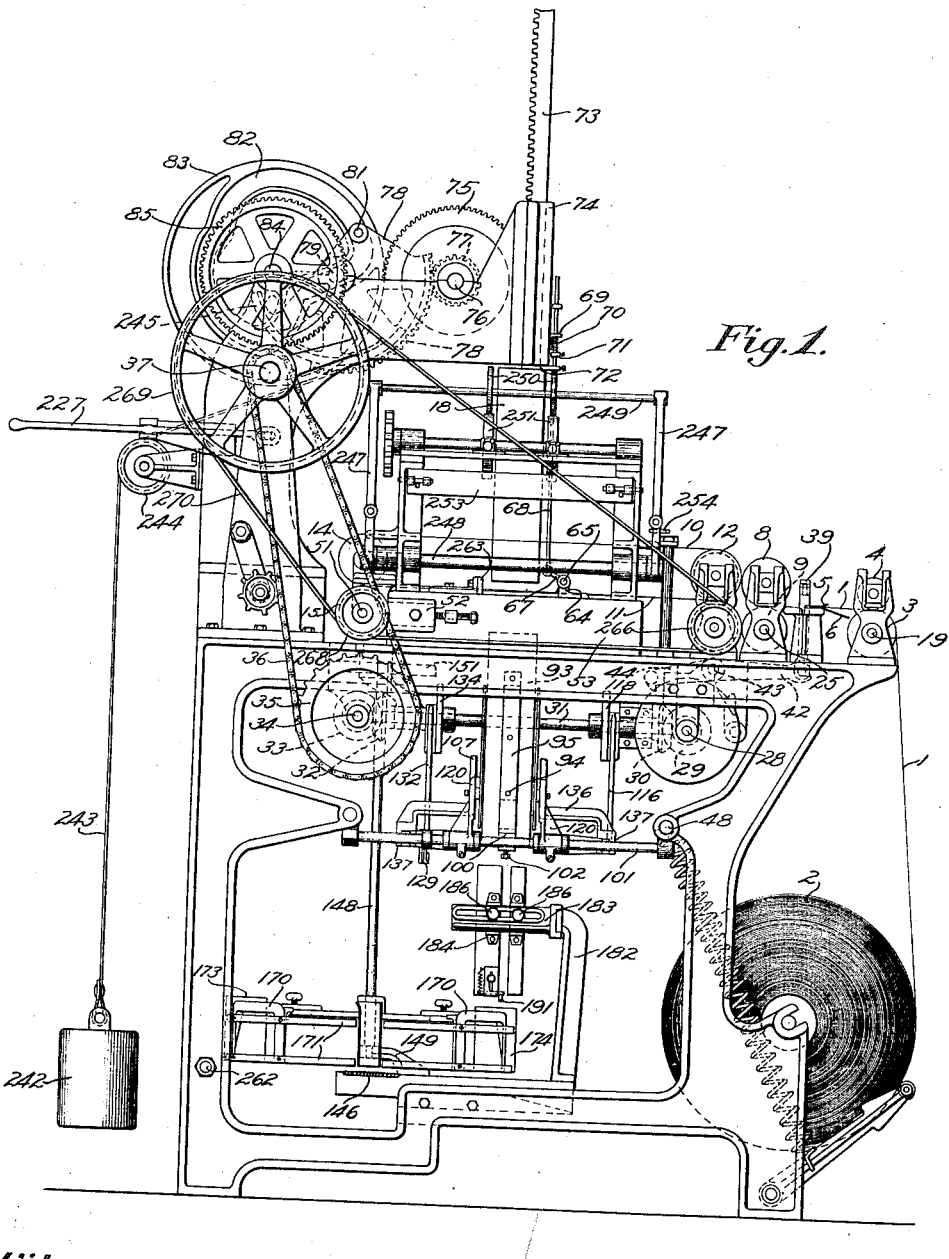

E. O. HILLER & W. A. JOPLIN.
MACHINE FOR LINING BOXES.
APPLICATION FILED APR. 6, 1911.

1,037,005.

Patented Aug. 27, 1912.
9 SHEETS—SHEET 1.

Witnesses:
R. Wallace,
John H. Parker

Inventors:
Everett O. Hiller
William A. Joplin
by Macleod, Calver, Copeland & Dike
Attorneys.

E. O. HILLER & W. A. JOPLIN.
MACHINE FOR LINING BOXES.
APPLICATION FILED APR. 6, 1911.

1,037,005.

Patented Aug. 27, 1912.

9 SHEETS—SHEET 2.

Witnesses:
R. Wallace,
John H. Parker

Inventors:
Everett O. Hiller
William A. Joplin
by Macleod, Calver, Copeland & Dike
Attorneys E. O. HILLER & W. A. JOPLIN.
MACHINE FOR LINING BOXES.
APPLICATION FILED APR. 6, 1911.

1,037,005.

Patented Aug. 27, 1912.

9 SHEETS—SHEET 3.

Witnesses:
R. Wallace,
John H. Parker

Inventors:
Everett O. Hiller
William A. Joplin
by Macleod, Calver, Copeland & Dike
attorneys.

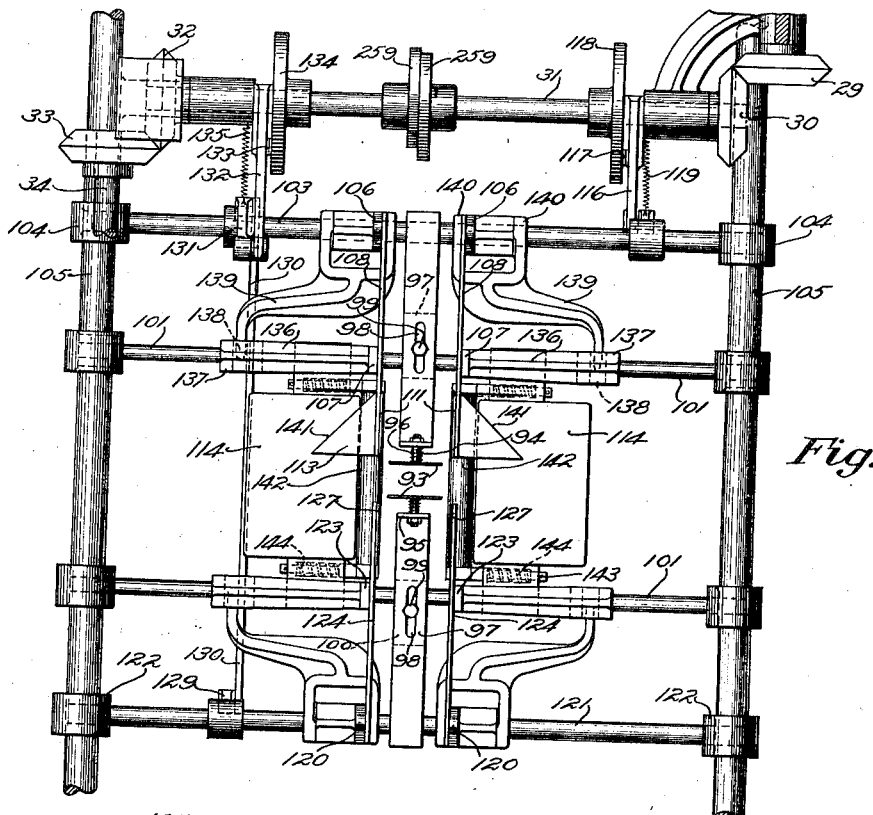
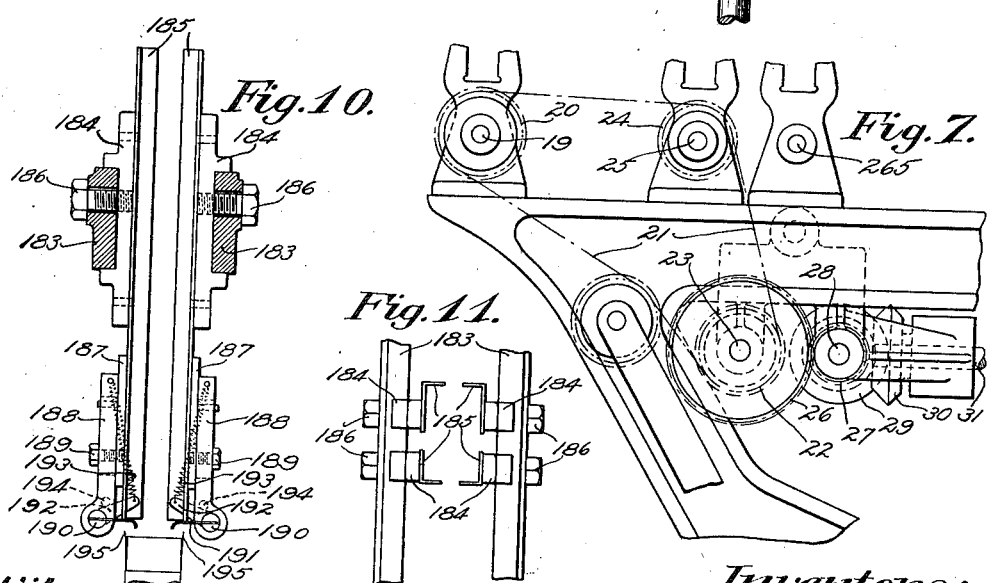

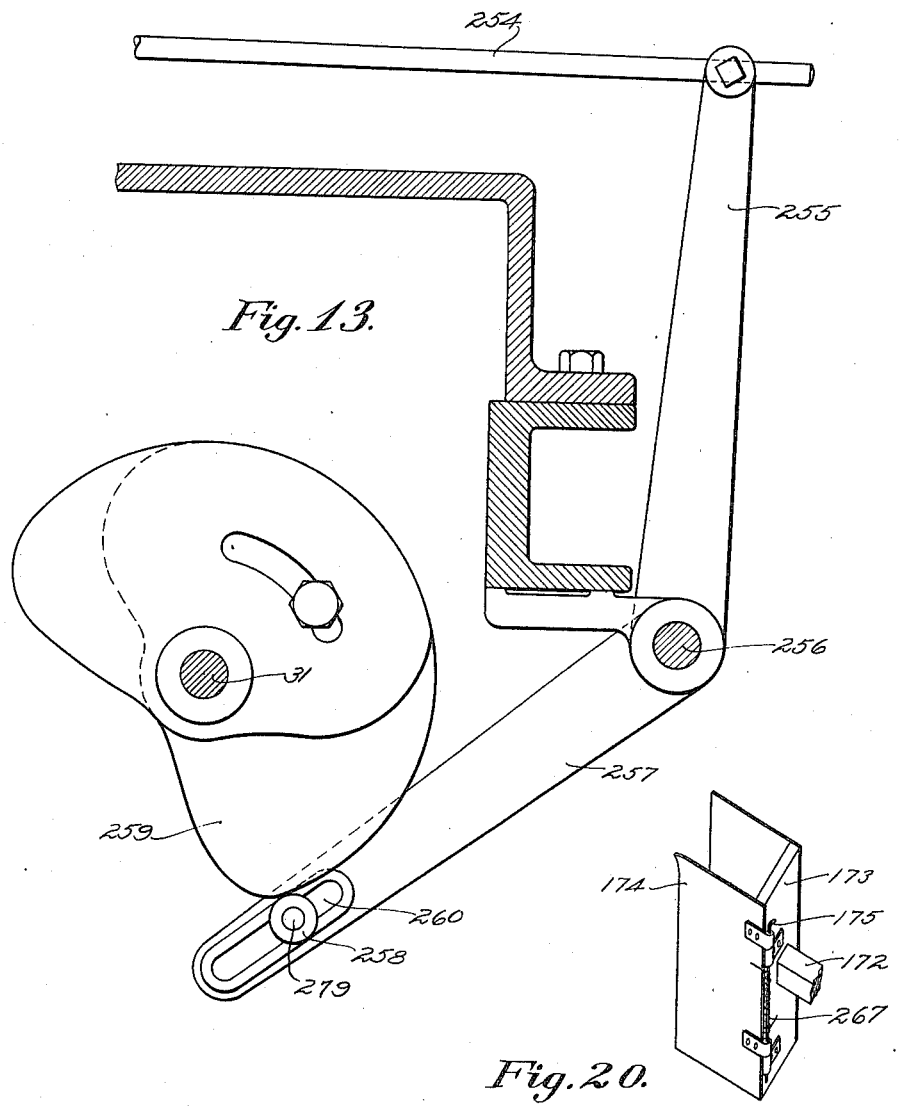

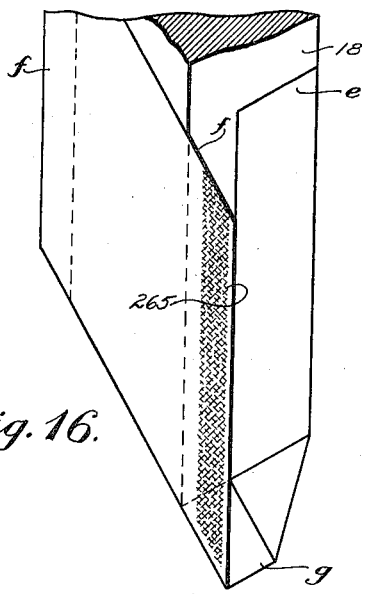
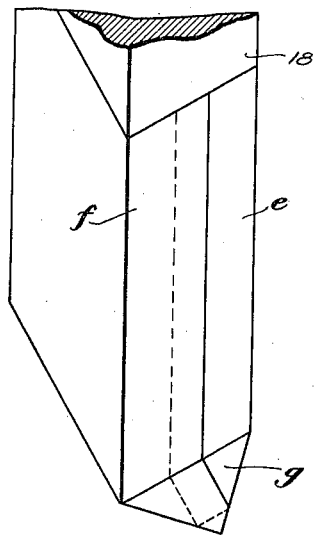
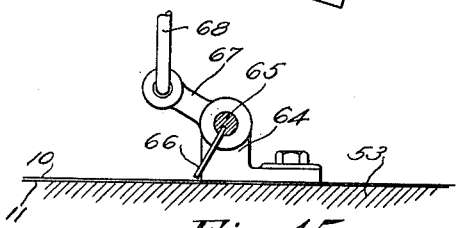
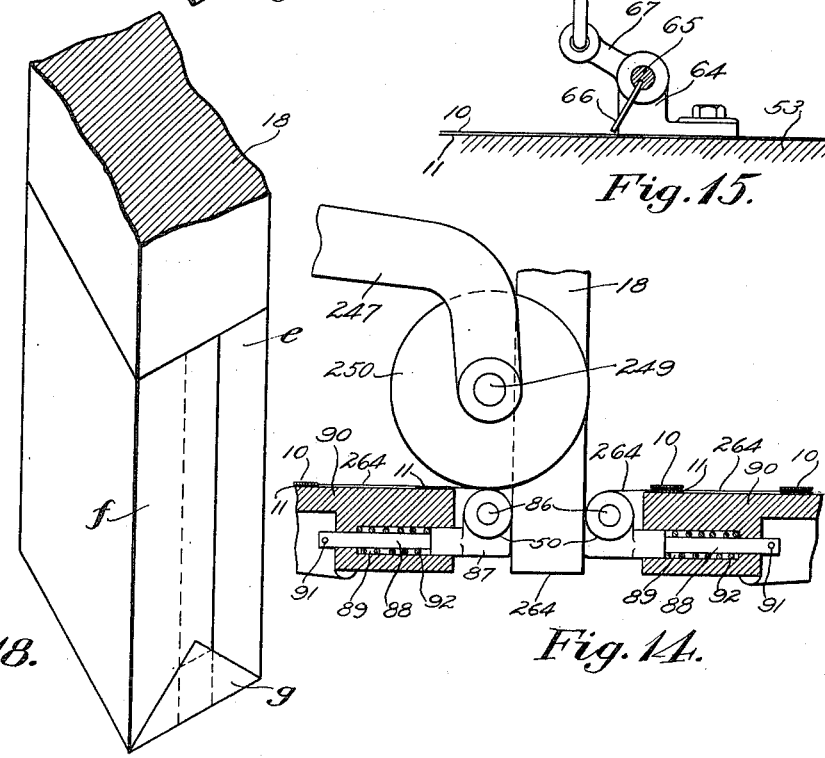

E. O. HILLER & W. A. JOPLIN.
MACHINE FOR LINING BOXES.
APPLICATION FILED APR. 6, 1911.
1,037,005.
Patented Aug. 27, 1912.
9 SHEETS—SHEET 8.
Fig. 21.
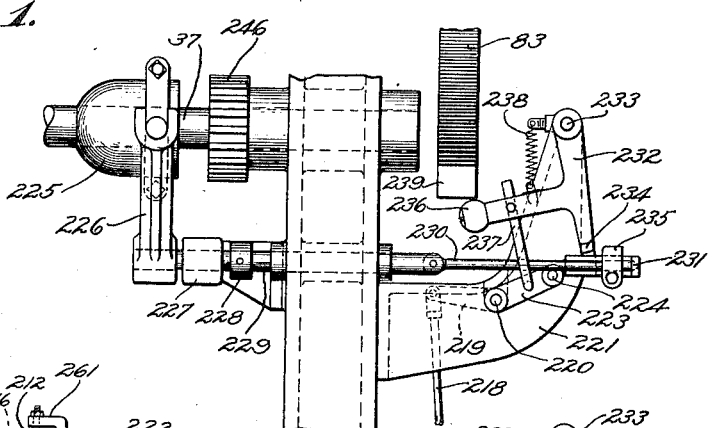
Fig. 23.
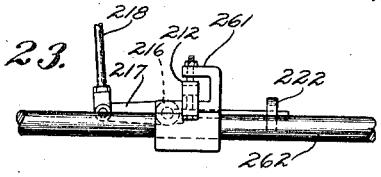
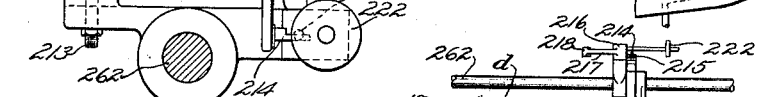
Fig. 22.
Fig. 24.
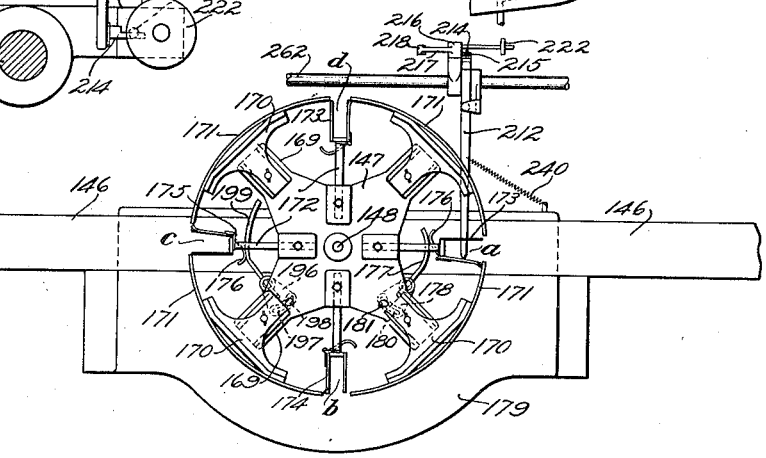
Fig. 19.
Witnesses:
R. Wallace,
John H. Parker.
Inventors:
Everett O. Hiller,
William A. Joplin,
by Macleod, Calver, Copeland & Dike
attorneys E. O. HILLER & W. A. JOPLIN.
MACHINE FOR LINING BOXES.
APPLICATION FILED APR. 6, 1911.

1,037,005.

Patented Aug. 27, 1912.
9 SHEETS—SHEET 9.

Witnesses:
R. Wallace,
John H. Parker

Inventors:
Everett O. Hiller
William A. Joplin
by Macleod, Calver, Copeland & Dike
Attorneys.

UNITED STATES PATENT OFFICE.

EVERETT O. HILLER, OF QUINCY, AND WILLIAM A. JOPLIN, OF LAWRENCE, MASSACHUSETTS, ASSIGNORS TO PNEUMATIC SCALE CORPORATION, LIMITED, OF QUINCY, MASSACHUSETTS, A CORPORATION OF MAINE.

MACHINE FOR LINING BOXES.

1,037,005.   Specification of Letters Patent.   Patented Aug. 27, 1912.

Application filed April 6, 1911. Serial No. 619,222.

*To all whom it may concern:*

Be it known that we, EVERETT O. HILLER and WILLIAM A. JOPLIN, citizens of the United States, residing at Quincy, in the county of Norfolk, and Lawrence, in the county of Middlesex, respectively, both in the State of Massachusetts, have invented a certain new and useful Improvement in Machines for Lining Boxes, of which the following is a specification, reference being had therein to the accompanying drawings.

The invention is especially intended for application to machines which are to be used for putting up package goods, so termed, and to be used in connection with machines for setting up the cartons before the lining is inserted and for then presenting the lined carton for the package filling mechanism, but the invention is not intended to be limited to use in connection with the carton setting up mechanism or with the package filling mechanism; neither is it intended to limit the application of the invention to use in lining what are technically termed cartons but it may be employed for lining boxes of any suitable form of construction.

The drawings illustrate a machine especially adapted for use in connection with a carton closing and filling machine and in the specification the word "carton" is intended to broadly include a box of any suitable form.

So far as we are aware in all box lining machines heretofore made, the blanks for the lining have been previously cut and have been placed in a stack from which they are taken, one by one, to feed to the lining machine and they are then in some manner delivered to the lining machine.

One object of the present invention is to cut the blanks from a continuous strip, and fold the blanks thus formed and insert them into a box.

So far as we are aware in all box lining machines heretofore made the lining has simply been folded and inserted into the box without the application of any adhesive to the lapped joints of the lining.

One object of the present invention is to fold the lining, to unite together the lapped edges by adhesive so as to form a tight joint to the lining.

In some other machines heretofore made in which the lining is formed from a flat sheet folded about a plunger or former block, the sheet which is beneath the plunger is folded up against two sides of the plunger into a U-shape, thus forming two sides of the lining, and then the projecting ends of the horizontal bottom portion of the U are turned up against the other two sides of the plunger and then the projecting sides of the previously up-turned portions are folded, the result being that a pocket fold is formed inside the lining which is objectionable in that it affords crevices for the material which is subsequently put into the lined carton. This fault of construction is usually due to the fact that the side wings are folded while the plunger about which the lining is formed is in motion.

One object of the present invention is to fold the side wings before the projecting end portions of the bottom are folded up so that the pocket formed by folding the projecting end portions will come on the outside of the lining instead of on the inside. This we accomplish by folding the side wings while the plunger is at rest.

Another object of the invention is to provide means for transferring a carton from a feed belt to a position outside of the path of travel of the feed belt to receive the lining and then to transfer the lined box to a discharge belt which may either be a continuation of the feed belt or may be an independent belt.

Inasmuch as the cartons in common use, although rectangular, are oblong instead of being square in cross-section and inasmuch as in practice it is found most advantageous to have the cartons travel broadside on in the delivery to and discharge of the carton from the lining mechanism and also inasmuch as it is desirable to fold the wide side of the lining before the narrow sides are folded it becomes important to turn the carton from the broadside position that it occupies when it comes from the delivery belt into a position at right angles thereto, that is with the narrow side parallel with the line of travel with the feed belt in order to properly position it for the lining mechanism.

One object of the invention is to provide means for thus turning the carton.

Other features of the invention will be more particularly set forth in the specification and claims.

In carrying out the invention a sheet of paper whose width is equal to the greatest length of the blank to be formed for the lining is fed from a continuous roll by a feed which passes it along into engagement with another pair of feed rolls, the blank being severed from the strip between two pairs of feed rolls, the severed blank then being fed forward to a position beneath the plunger block about which the blank is subsequently folded. The blank is wider than the plunger. The blank rests on supports above two parallel rolls which are spaced apart sufficiently to allow the plunger block to pass down between them carrying the blank with them, the said parallel rolls being yieldingly mounted so that they may spread slightly apart from each other under the pressure of the plunger block and the projecting ends of the blank rub against said rolls during the descent of the plunger causing the blank to fold up against two opposite wide sides of the plunger in U-shape and projecting each side beyond the plunger. The rolls for folding are preferable to a non-rotatable square folding edge because a square folding edge is apt to tear the blank, and it is also preferable to have the folders rotatable rather than non-rotatable. While the plunger is carrying the blank down in the manner above described, two glue rolls which are carried by movable arms and are normally outside of the plunger are caused to move forward and engage the blank to apply a narrow film of glue on the upper face near both edges of the wings of that part of the blank which forms one of the upturned legs of the blank, that is the part which is folded on one side of the plunger, the portion of the blank which folds up on the other side of the plunger being unglued. The plunger dwells when it has descended far enough for the blank to be folded up into the U-shape against the two opposite wide sides of the plunger. Mechanism is provided which then moves to fold the two unglued vertical wing portions of the blank horizontally against the two narrow sides of the plunger which are at an angle to the two wide sides against which the blank was first folded and then the projecting vertical or wing portions to which the glue has been applied are folded over outside of the side wing portions first folded. The folding of the vertical side wings forms at the bottom two oppositely projecting horizontal portions folded in triangular form. The plunger again descends and during its descent the said triangular projecting bottom portions are turned up and folded outside of the last folded side portions, and the plunger then moves down between guides which prevent the folded lining from springing away from the plunger and then actuates mechanism to spread the top closing flaps of the carton out of the way of the plunger and the plunger with the lining then enters the carton which had been positioned to receive it. A revolving carrier is provided to position the carton and remove them after the lining is inserted. In order that the feed of the paper may be as short as possible it is preferable that the strip of paper be as wide as the greatest length of the blank that is to be used for the lining and inasmuch as it is also preferable to have the lap joints of the folded lining on the narrower sides of the carton rather than on the wider sides it becomes important to swing the carton from its broad side position in which it is presented by the delivery belt around into a position at right angles to its former position for the purpose of properly positioning it to receive the lining as well as to move it off of the continuously moving delivery belt so that it may be stationary while the lining is being inserted.

Another object of the invention is to provide mechanism for stopping the machine if there is any skip in the proper delivery of cartons from the delivery belt to the mechanism for transferring them to the lining mechanism.

The invention will be fully understood from the following description taken in connection with the accompanying drawings, and the novel features will be pointed out and clearly defined in the claims at the close of the specification.

Figure 2:
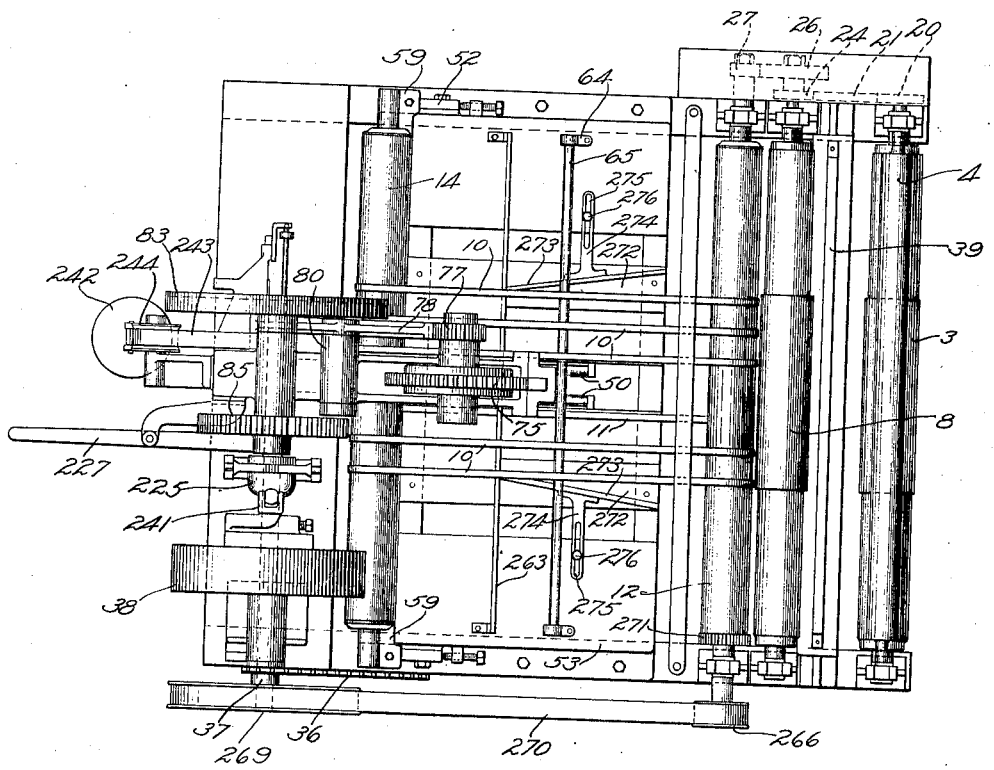
Figure 3:
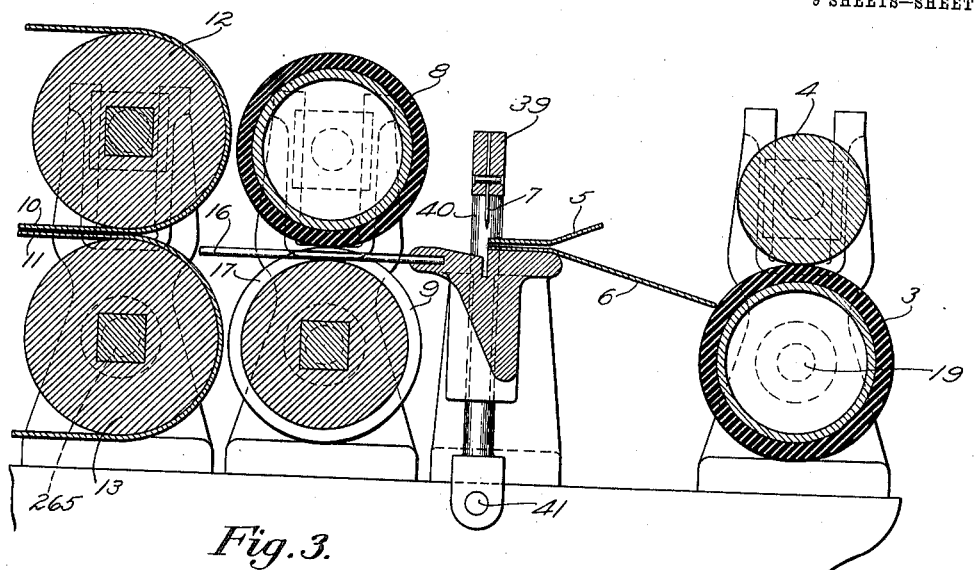
Figure 6:
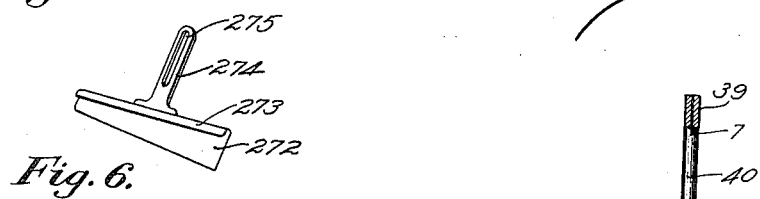
Figure 4:
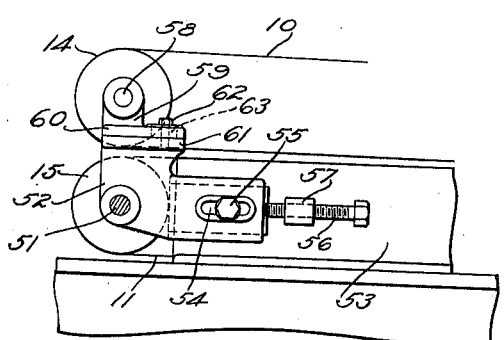
Figure 5:
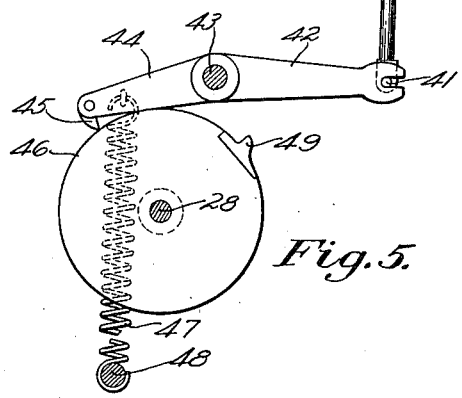
Figure 9:
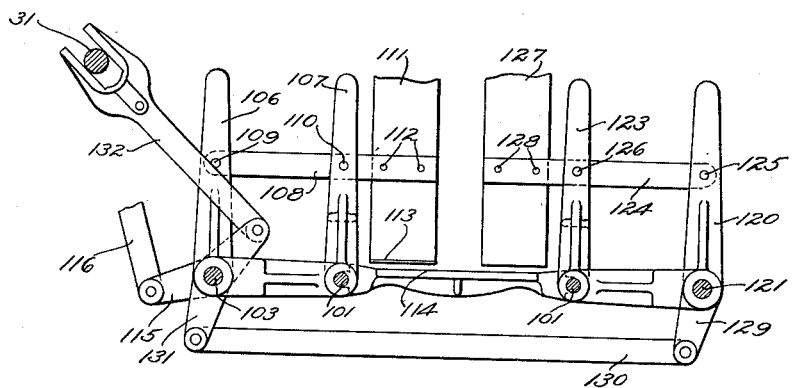
Figure 12:
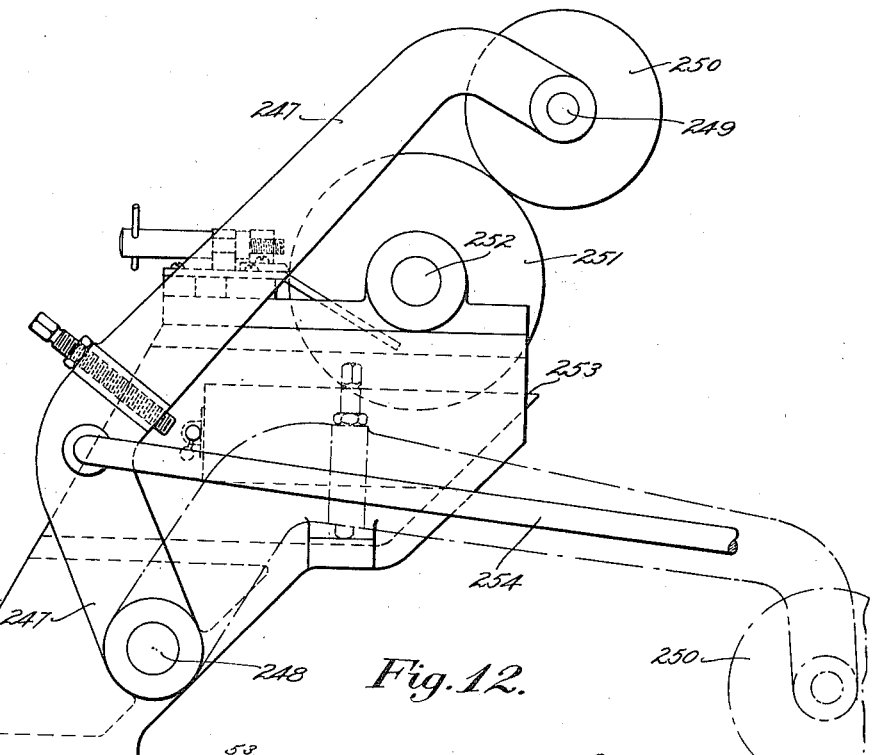
Figure 26:
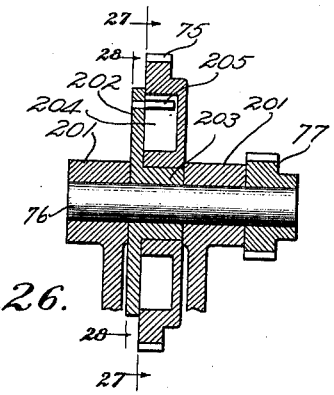
Figure 25:
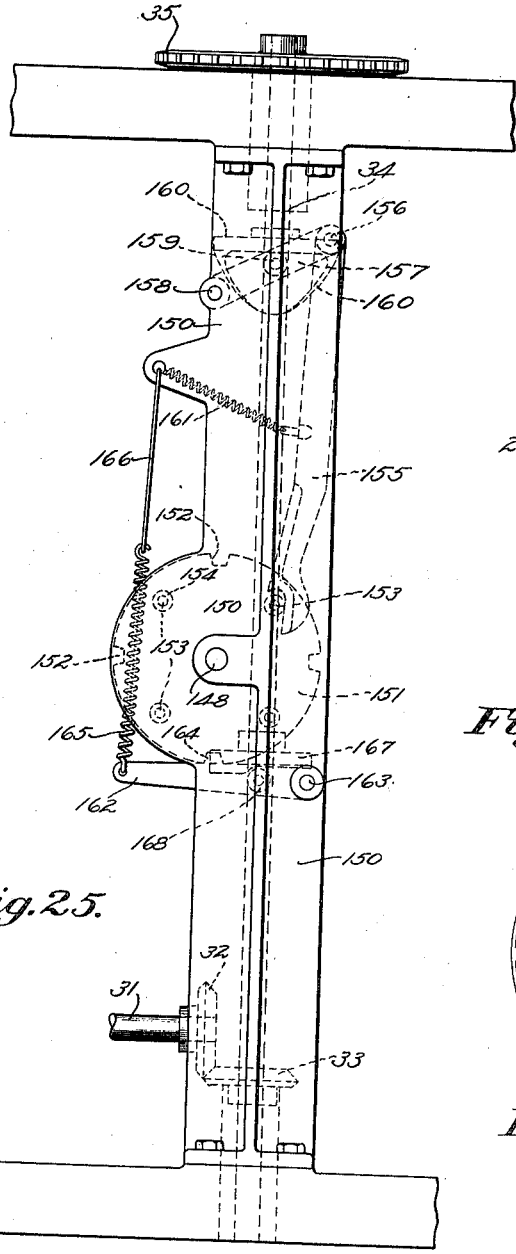
Figure 27:
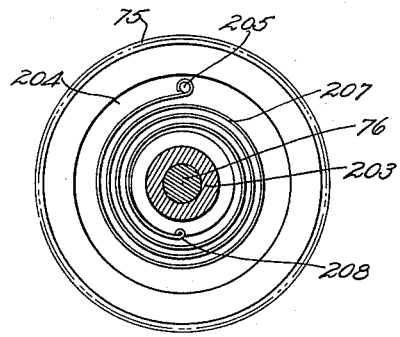
Figure 28:
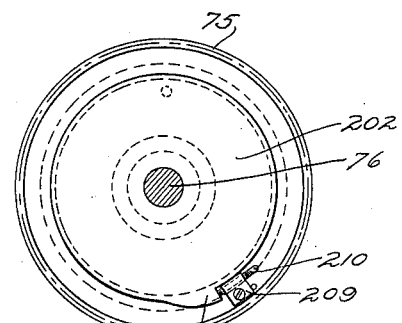

In the drawings,—Figure 1 is a side elevation of a machine embodying the invention. Fig. 2 is a plan of the machine shown in Fig. 1. Fig. 3 is an enlarged sectional view showing the mechanism for feeding the strip of paper past the cutting mechanism to the feed tapes which carry it to position beneath the plunger. Fig. 4 is a side elevation in detail showing the means for adjusting the forward tape rolls. Fig. 5 is a side elevation showing in detail the mechanism for actuating the cutter. Fig. 6 is a perspective detail of one of the guide plates for actuating the paper blank while it is being carried by the feed tapes. Fig. 7 is a side elevation enlarged showing the method of driving the paper feed rolls. Fig. 8 is a plan of the flap folding mechanism which is below the platen. Fig. 9 is a sectional elevation showing the mechanism for folding the side flaps. Fig. 10 is a vertical sectional elevation showing the guides for the plunger in the latter part of its descent and the mechanism for spreading the top flaps of the cartons. Fig. 11 is a plan view of the guide mechanism shown in Fig. 10. Fig. 12 is an elevation enlarged showing the gluing mechanism. Fig. 13 is a section elevation showing the mechanism for actuating the glue rolls. Fig. 14 is a section elevation showing the plunger in its passage between the first pair of folding rolls showing the glue roll in engagement with the lining blank. Fig. 15 is a sectional elevation enlarged showing the gate which is for the purpose of checking the advance of the lining blank until the plunger has completed its ascent. Fig. 16 is a detail view showing the lining blank after it has been turned up against two broad sides of the plunger and one pair of the side flaps are folded. Fig. 17 is a view showing the second pair of side flaps folded over the first pair of side flaps. Fig. 18 is a view showing the bottom flaps folded up outside of the outer pair of side flaps. Fig. 19 is a plan of the rotary carrier which positions the boxes to receive the lining and also of the delivering and transferring mechanism for the boxes. Fig. 20 is an enlarged detail view of one of the hinged pockets for the boxes. Fig. 21 is an elevation showing the mechanism for disengaging the clutch to stop the machine unless a box has been delivered to the rotary box carrier at the proper station, the clutch being shown disengaged. Fig. 22 is a side elevation showing a portion of the parts shown in Fig. 21 in the position they will be when the clutch is engaged. Fig. 23 is a side elevation enlarged of a portion of the stop mechanism, shown in Fig. 19, for stopping the machine unless a box is delivered to the box carrier, the box carrier being omitted. Fig. 24 is a sectional elevation of the parts shown in Fig. 23 viewed from the right of Fig. 23. Fig. 25 is a plan view of the mechanism for giving the intermittent movement to the box carrier. Fig. 26 is a vertical section through the gear which drives the plunger. Fig. 27 is a section on line 27—27 of Fig. 26. Fig. 28 is a section on line 28—28 of Fig. 26.

Referring now to the drawings—a long strip of paper 1 from which the lining blanks are cut is run from a roll 2 and passes up through suitable feed and guide mechanisms to a point where a blank of the suitable length is severed from the strip whence the severed blank is transferred to the mechanism for shaping the lining. In the form of construction shown for feeding and cutting and transferring the blank the strip passes between a feed roll 3 and a loosely mounted pressure roll 4 which serves to press the sheet into contact with the feed roll 3 whence it passes between the two flat guides 5, 6, to a position beneath a cutter 7. Said cutter 7 reciprocates vertically so that in its downward stroke it severs that portion of the strip which projects forward beyond the front end of the guides 5, 6. The speed of the feed is so adjusted that a suitable length of the strip will project beyond the forward ends of the guides 5, 6, at each downward stroke of the knife to form a blank 264 of the requisite length. Before the blank is severed from the strip its forward end will be gripped between feed rolls 8, 9, which hold the strip taut while the blank is being severed and carries the severed blank forward between the feed tapes 10, 11, which respectively run around the rolls 12, 13. The upper feed tapes 10 also run around a forward roll 14 and the under feed tapes 11 run around the forward roll 15. In order that the forward end of the blank may not sag in its passage from the feed rolls 8, 9, to the feed tapes 10, 11, too far to be taken up by the feed tapes, guides 16 are provided to support the blank, said guides as shown consisting of a series of rods 16 which pass through grooves 17 in the periphery of the roll 9, see Fig. 3.

The feed rolls 8, 9 are caused to revolve a little more rapidly than the surface speed of the feed roll 3, so as to be sure to take up any slack that there might be, if any, in the paper strip and keep the paper taut. The roll 8 is loosely mounted so that there will not be any undue tension strain on the paper due to the greater surface rotation of the feed rolls 8, 9, than the surface speed of the feed roll 3 in case the paper should be drawn taut before the cutter 7 descends. The loose mounting of the feed roll 8 will allow a slip of the feed roll 8 to prevent such undue tension. The surface speed of the rolls 12, 13 and therefore of the feed tapes 10, 11, should be considerably greater than the surface speed of the feed rolls 8, 9, because it is desirable after the blank is once severed to carry it as quickly as possible to its position beneath the plunger block 18 which serves as the former around which the lining blank is to be folded.

The pressure roll 4 is driven by frictional contact with the roll 3 and the roll 8 is driven by frictional contact with the roll 9. The means for driving the rolls 3 and 9 are as follows:—The roll 3 is mounted on a shaft 19 on which is also mounted a sprocket 20 around which passes a chain 21, said chain 21 passing around a sprocket 22 mounted on shaft 23, thence the chain 21 passes up over a sprocket 24 mounted on shaft 25 which carries the feed roll 9. On shaft 23 is mounted a gear 26 which in turn engages with a pinion 27 mounted on shaft 28, said shaft 28 carrying a beveled gear 29 which engages with a beveled gear 30 mounted on shaft 31. Said shaft 31 carries a beveled gear 32 which meshes with a beveled gear 33 on shaft 34. Said shaft 34 carries a sprocket wheel 35 around which passes a sprocket chain 36 which passes around a sprocket on the driving shaft 37. Said driving shaft 37 is driven by a pulley 38 which receives the power from any suitable source. The sprocket 20 on shaft 19 which carries the feed roll 3 is of a little greater diameter than the sprocket 24 on shaft 25 which carries the feed roll 9 thereby giving a greater surface speed to the feed roll 9 than to the feed roll 3.

The tape rolls 12, 13, 14, 15 may be driven by any suitable mechanism, the mechanism shown in the drawings being as follows:— The tape roll 13 is mounted on shaft 265 (see Figs. 3 and 7) on which is mounted also a pulley 266. Roll 15 is mounted on shaft 51 on which is also mounted a pulley 268. A pulley 269 is mounted on the driving shaft 37. A belt 270 passes around the pulleys 266, 268 and 269, thus positively driving the tape rolls 13 and 15. A gear wheel mounted on shaft 265 which carries the tape roll 13 engages with a gear wheel 271 on the shaft which carries the tape roll 12, thus driving the tape roll 12. The tape roll 14 is frictionally driven by the tapes 10 which are driven by the roll 12.

In order to allow for any tendency of the paper blank to slip sidewise after it is delivered to the feed tapes and before it is positioned beneath the plunger, guides are provided as follows, (see Figs. 2 and 6:) On the outer side of each of the outer tapes 10 is located a guide plate 272 formed with a lip 273 which is adapted to engage the edge of the blank, said lips 273 being arranged to converge in the direction of the path of the movement of the blank so that if the blank does slip to one side the converging lips will gradually direct the blank into proper alinement with its position beneath the plunger. The guide plates 272 are preferably adjustable toward and from each other to accommodate blanks of different widths. This adjustment is secured by providing each guide plate 272 with an arm 274 formed with an elongated slot 275 through which passes a bolt 276 which secures the arm to the platen 53.

The knife 7 preferably has a saw-tooth edge. It is a long blade mounted in a cutter bar 39 which is supported at its ends by the vertical rods 40 which have a vertically reciprocating movement to carry the cutter bar and cutter up and down. The lower end of each rod 40 is pivotally connected at 41 with a rocking lever 42 made fast on shaft 43, there being a rocking lever 42 for each of the rods 40. See Figs. 1, 3 and 5. Mounted fast on the shaft 43 intermediate between the levers 42 is a lever 44 which carries at its forward end a steel block 45 which engages with the periphery of the cam 46 and is held in engagement therewith by a spring 47, one end of said spring being secured to the lever 44 and the other end of said spring being made fast to a stationary support 48. On the periphery of the cam is a cam block 49 which engages with the steel block 45 on the lever 44 once during each rotation of the cam 36 thereby turning the levers 44 and 42 and pulling down the rod 40 thereby also causing the descent of the cutter bar 39 and cutter 7. As soon as the cam block 49 rides past the steel block 45, the spring 47 will pull down the forward end of the lever 44 thereby, through the connecting mechanism, causing the ascent of the cutter bar 39. The cam 46 is mounted on shaft 28 so that it is actuated by the same mechanism which actuates the feed rolls and the period of its movement is controlled thereby.

The length of the blank which is severed from the strip will depend upon the rate of rotation of the feed roll 3 which in turn will depend upon the relative diameter of the gear 26 and pinion 27.

The blank 264 is carried by the feed tapes 10, 11, which grip the blank between them into proper position beneath the plunger 18. There is a series of these tapes 10 parallel with each other which contact with the blank at a sufficient number of points to properly support it in a flat form, the two tapes which are on either side of the middle of the series being spaced apart far enough to allow for the passage of the plunger 18 between them and also far enough apart to allow for two rolls 50, 50, inside of said two tapes, said rolls being spaced apart sufficiently to allow the passage of the plunger between them. See Figs. 2, 3 and 14.

In order to maintain the proper tension of the tapes 10 11 either the forward or the rear pair of the rolls should be made adjustable toward and from the other pair. In the drawings the forward rolls 14, 15 are for this purpose made adjustable. This is accomplished as follows: The lower forward roll 15 is mounted on a shaft 51 which is journaled in brackets 52, 52 each of which brackets is adjustably secured to the platen 53. (See Figs. 1 and 4). Said bracket 52 is formed with an elongated slot 54 and is clamped to the upright portion of the platen by a bolt 55 which passes through said elongated slot into the platen. A stop screw 56 passes through a tapped out lug 57 which is fast to the platen and its forward end bears against the end of the bracket 52 which serves as a positive stop to prevent the strain of the tapes pulling the bracket in a direction to slacken the strain on the tapes. By loosening the bolt 55 the bracket 52 may be adjusted to the proper position and then by setting up the bolt 55 the bracket will be clamped in its adjusted position. The stop screw 56 should be moved back or set up to be always maintained in contact with the bracket after the bracket has been adjusted. The forward or back adjustment of the bracket 52 will at the same time adjust both rolls 14, 15. The roll 14 also has an independent adjustment with relation to the roll 15 so that the tapes 10 may be adjusted independently of the tapes 11. For this purpose the shaft 58 of the roll 14 is journaled in bearings 59 which are adjustably secured to the bracket 52. The means shown for securing this adjustment is as follows:—The bearing 59 has a flange foot 60 which rests upon a flange 61 of the bracket 52, and is secured thereto by a clamp screw 62 which passes through an elongated slot 63 in the said flange foot 60, and screws into the flange 61 of the bracket 52. It is obvious therefore that thereby the bearing 59 for the shaft 58 may be adjusted.

It is important that the blank should not be fed forward far enough to strike against the side of the plunger 18 while the plunger is down so as to buckle up against the side of the plunger, nor should it be fed forward far enough to move into the path of the plunger above the top of the plunger when the plunger is at the lower part of its stroke. A movable gate is provided to limit the forward movement of the blank until the plunger makes its return upstroke, so that whenever the blank is fed it will move beneath the plunger. See Figs. 1 and 15. It is important that this gate mechanism should be controlled by the movement of the plunger so that it will be released at the proper time when the plunger makes its ascent and also set at the proper time when the plunger makes its descent. The means shown is as follows, (see Figs. 1 and 15:) Journaled in suitable bearing 64 is a rockshaft 65 which extends transversely in a horizontal position above the path of movement of the blank at some distance before the blank reaches the path of travel of the plunger 18. Said rock shaft has secured to its periphery a series of arms or pins 66 which are adapted to extend down between the tapes 10 so as to form a stop against which the advance edge of the blank will strike if the blank has been carried forward to that point while the pins are in that position. Rigidly projecting from said rock-shaft 65 is an arm 67 whose other end is pivotally connected with the connecting rod 68 which extends vertically upward passing loosely through a guide 69. The rod 68 is movable up and down to rock the shaft 65 and thereby raise the pins 66 out of the path of the blank or to depress them into their operative position. A spring 70 coiled around the connecting rod 68 is seated upon a collar 71, the upper end of the spring bearing against the guide 69. Preferably the collar 71 is adjustable on the rod 68 so as to vary the tension of the spring 70. The tension of the spring is such that it normally holds the connecting rod 68 in its lowermost position whereby the pins 66 are in their downward position between the tapes 10. Secured to the rod 66 is a finger 72 which projects into the path of the plunger 18 over the top thereof so that when the plunger rises it will engage the finger 72 and thereby lift the connecting rod 68 and turn the rock shaft 65 so as to raise the pins 66 out of their stop position and will hold them in this elevated position until the plunger descends. When the plunger descends the expansion of the spring 70 will move the rod 68 downward thereby moving the stop pins down into their operative position. In the meantime, however, after the plunger has moved the connecting rod upward so as to release the stop pins from operative position the continuous feed movement of the tapes will have carried the blank forward completely out from under the stop pin 66 into position beneath the plunger 18. These stop pins 66 will be positioned far enough away from the path of travel of the plunger so that there will be sufficient space between the pins and the path of travel of the plunger for the rearwardly extending portion of the positioned blank which is afterward to form one of the upright walls of the lining.

The lining blank is to be folded about the plunger 18 and carried by the plunger 18 into the carton. This folding operation is performed at successive stages in the descent of the plunger. The mechanism for reciprocating the plunger is as follows, (see Figs. 1 and 2:) Rising from the top of the plunger 18 and rigidly connected therewith is a rack 73 which passes up through a guide 74. The teeth of the rack 73 mesh with the teeth of the gear 75, mounted on a shaft 76 on which also is mounted a pinion 77, said pinion 77 meshing with a rocking gear segment 78 mounted on a stud or rocker shaft 79. Said stud 79 is journaled in a bearing 80. Projecting from the side of the gear segment is a stud on which is mounted a roll 81 which engages with a cam groove 82 in the side of a cam 83. Said cam 83 is mounted on a shaft 84 which carries a gear 85, said gear 85 engaging with a pinion 246, on the driving shaft 37. Thus through the connecting gearing the cam 83 is rotated by the driving shaft. The form of the cam path 82 is such that the gear segment 78 will be given a rocking movement thereby giving to the pinion 77 a rotary movement, first in one direction and then in the other, and through the connecting intermediate gear 75 giving to the rack 73 alternately an up and down movement. The form of the cam path 82, however is such that during each rotation of the cam there will be a dwell of the rack and therefore of the plunger at some part of its descent. In order to counterbalance the weight of the rack 73 and plunger block 18 so that they may be moved up with the least resistance, there is provided a counterweight 242 suspended from a belt 243 which runs over a pulley 244 and thence over a curved flange 245 on the face of the gear segment 78, the end of the belt being made fast to the flange.

As previously stated the rolls 50 are located on a level with each other just below the level of the tapes 10, and the plunger 18 passes down between them. It is preferable that the rolls should be mounted in yielding bearings so that they may be spread laterally apart from each other and that normally the space between them should be a little less than the thickness of the plunger so that they will have to be spread apart for the passage of the plunger. The means shown for so mounting the rolls 50, 50, is as follows, (see Fig. 12:) Each roll 50 is mounted on a shaft 86 which is journaled in bearings 87 at opposite ends of the shaft, each of said bearings 87 being formed with a stem 88 which passes loosely through a hole 89 in a plate 90 mounted on the platen 53. A pin 91 prevents the stem 88 from being pulled out through the forward end of the hole 89 and a spring 92 coiled around the stem and bearing against a shoulder on the stem normally holds the roller in the most outward position which is allowed by the stop pin 91 so that the two rolls 50 are thus held normally in their most proximate relation to each other. The blank for the lining, as previously stated, lies on the tapes 10, 10, centrally over the space between the rolls 50. When the plunger descends its bottom engages the lining blank and carries the engaged portion down between the rolls 50 which yield slightly to allow the descent of the plunger. See Fig. 14. By reason of the engagement of the rolls with the blank, the blank will be turned up against the two opposite sides of the plunger substantially U-shape, the two turned-up portions being as yet in flattened form although standing vertically and being wider than the plunger so that the upturned portions extend in both sides beyond the plunger. In Fig. 14 the plunger is shown as having only partially completed its descent, the blank being partially folded. The plunger with the blank thus turned up against its two opposite sides will descend, passing down between two vertical flat guide plates 93 (see Figs. 1 and 8.) These guide plates 93 should be close enough together to form a close fit for the plunger and turned-up lining blank so as to keep the blank folded flat against the sides of the plunger. Preferably these guide plates 93 are yieldingly mounted so that they may be spread slightly and their upper ends should preferably flare slightly so as to easily admit the lower ends of the plunger with the lining. The means shown for yieldingly mounting the guide plates 93 is as follows, (see Figs. 1 and 8:) Secured to each guide plate is a series of studs 94 which pass loosely through the vertical brackets 95 and are normally held in their most proximate position with relation to each other by springs 96, the springs yielding under pressure to allow the guide plates to be spread apart. The brackets are preferably made adjustable toward and from each other so as to get an adjustment for plungers of varying size to adapt them for use with cartons of varying sizes. The means for adjusting the brackets is as follows:—Each bracket 95 is formed with a horizontal base portion 97 having an elongated slot 98 through which passes a clamp screw 99 by which the base of the bracket is clamped to a block 100. Said block 100 is clamped to a tie rod 101 by clamp screw 102. After the plunger with the lining thus folded against its sides has passed down between the guide plates 93 it comes to a dwell by reason of the form of the cam path 82 while it is still embraced between said guide plates 93 and remains in a stationary position while certain folding mechanism comes into operation to fold the vertical side wings previously described against the other two vertical sides of the plunger which are at right angles to the two vertical sides against which the blank was first folded. If the plunger is of oblong form in cross-section it is preferable to have the blank first folded against the two wide faces or sides and the second folding operation against the two narrow sides or faces and in describing the construction and operation it is assumed that the blank has just been folded upon the two wide faces. (See Figs. 16, 17 and 18). The blank is of sufficient width so that each of the two flat upright portions e, f, formed by the first step in the folding projects on each side beyond the edge of the wide face of the plunger and the bottom portion g of the blank will extend laterally beyond the edges of the bottom of the plunger. These laterally projecting upright portions e, f, are for convenience termed side flaps or wings and the next step in the operation is to fold these side flaps against the narrow sides of the plunger. Each of these side flaps e, f, is preferably of sufficient width to cover nearly the full narrow face of the plunger, or at least to extend more than half way across so that the two flaps that are folded upon the same narrow side will overlap each other. It is therefore necessary in such case that one of each pair of said side flaps shall be folded slightly in advance of the other although the corresponding flaps for the two narrow sides may be folded simultaneously. The means for folding these side flaps will now be described. (See Figs. 1, 8 and 9.)

Inasmuch as the two folding mechanisms which fold corresponding portions of the flap on each of the two narrow sides are exactly alike except that one is right-handed and the other is left-handed and inasmuch as they move simultaneously the same numerals will be given to corresponding parts of each pair.

A rocker-shaft 103 is journaled in bearings 104 supported by the side bars 105 which form a part of the frame. Made fast to said rocker-shaft 103 are the two upright arms 106. Pivoted on the tie-rod 101 are two upright arms 107. A link 108 is pivotally connected at 109 with each of the upright arms 106 and is also pivotally connected at 110 with the upright arm 107. A vertical folder-plate 111 is rigidly secured to each of the links 108 as by rivets 112 or other suitable means and is provided with a horizontal foot 113. Means are provided for rocking the shaft 103 thereby rocking the arm 106 and through the link 108 also rocking the arm 107 causing the folder-plate 111 which is rigidly connected with the link 108 to move in a vertical plane in the arc of a circle, the folder-plate being always in the vertical position so that when it rocks from the position shown in Fig. 9, which is its most upright position, it will move toward the opposite folder-plate 127, and at the same time move downward. When it moves forward it will engage the distending side flap e of the blank and fold it against the narrow side of the plunger and will sweep down at the same time until the foot 113 engages the horizontally projecting flap g of the blank which projects out from under the bottom of the plunger pressing it down upon the plate 114 which is about on a level with the bottom of the plunger and supports the horizontally distending flap g of the blank. This not only folds the upright flap e of the blank against the narrow side of the plunger but also creases the horizontal bottom flap g as shown in Fig. 16.

The means for rocking shaft 103 is as follows:—An arm 115 is made fast at one end to the shaft 103 and its other end is pivotally connected with one end of the rod 116. The other end of the rod 116 is forked and straddles shaft 31. Projecting from the connecting rod 116 is a stud carrying a roll 117 which engages with the periphery of the cam 118. The shape of the periphery of the cam is such as to cause the rod 116 to vibrate back and forth once in each direction during each rotation of the cam thereby causing the folding plate 111 to move forward and back once at each rotation. The roller 117 is held in constant engagement with the cam by a spring 119.

After the two corresponding side flaps e, e, have been folded by the folder-plate 111 and the bottom g has been creased, as described, the other pair of narrow side flaps f, f, are folded outside of the narrow side flaps e, e, just previously folded. (See Fig. 17.) The mechanism for doing this is as follows, there being two sets for the two corresponding flaps exactly alike except one being right-handed and one being left-handed. Two upright arms 120 are each made fast at their lower ends to a rocker-shaft 121, said rocker-shaft being journaled at its opposite ends in bearings 122 mounted on the supporting bars 105 of the frame and two upright arms 123 are pivoted at their lower ends to one of the rods 101. A link 124 is pivotally connected at 125 with upright arm 120 and is also pivotally connected at 126 with the upright arm 123. Rigidly attached to the link 124 is a folder-plate 127 as by rivets 128 in a similar manner as the folder-plate 111 is attached to the link 108. The folder-plate 127 is similar in form to the folder-plate 111 except that it does not have the foot 113. When the shaft 121 is rocked, the folder-plate 127 sweeps forward and down in the arc of a circle in the same manner as the folder-plate 111 moves, being always maintained in a vertical plane. As the two plates 127 move forward they engage the laterally extending vertical side flaps f, f, of the blank on the opposite side of the plunger to those previously folded and fold them outside of the previously folded narrow side flaps e, e, as shown in Fig. 17. Each of the two horizontal laterally extending bottom flaps is now folded into a horizontal triangular form as shown in Fig. 17 but are not yet turned up against the side of the plunger.

The means for rocking the shaft 121 so as to actuate the folder-plate 127 are as follows, (see Figs. 1, 8 and 9:) An arm 129 is made fast at one end to the rocker-shaft 121 and at its other end it is pivotally connected with one end of a connecting rod 130, the other end of said connecting rod being pivotally connected with one end of a rocker-lever 131. The other end of said rocker-lever 131 from that to which the rod 130 is connected is pivotally connected with a connecting rod 132 whose upper end is forked and straddles the shaft 31. A roll 133 mounted on a stud projecting from the connecting rod 132 engages with the periphery of a cam 134 mounted on shaft 31 whereby the connecting rod 132 is rocked back and forth once during each rotation of the cam and shaft 31. A spring 135 connected at one end with the rod 132 and at its other end with the rocker-arm 131 holds the roller 133 in constant engagement with the cam 134.

The upright arm 107 has at its lower end a horizontal arm 136 which terminates in a downwardly extending fork 137 which straddles the ends of a hub 138 on the end of a bent bracket 139. One of the rods 101 passes loosely through the legs of the fork 137 and through the hub 138 which is between the legs of the fork. The other end of the bracket 139 is also forked and the shaft 103 passes loosely through the legs of the fork. Said two legs of the fork at the end of the bracket 139 straddle the upright arm 106 and the hub of said upright arm as shown in Fig. 8. By reason of the fact that the arm 106 is fast on the rod 103, the bracket 139 whose fork 140 at one end embraces the lever 106 is prevented from sliding movement longitudinally of the rod 103 and inasmuch as the fork 137 embraces the hub 138 of the arm 136 connected with the upright arm 107, the upright arm 107 is maintained in constant relative position to the arm 106. If desired the arm 106 may be adjustably secured on the shaft 103 by any suitable means as by a set-screw so that the arm 106 may be adjusted longitudinally of the arm 103 and in that way the arm 107 will also be correspondingly adjusted. The purpose of such adjustment would be to accommodate the mechanism to plungers of varying thickness.

In order to maintain the upright arms 120 and 123 in constant position with relation to each other, means similar to that just described in connection with upright arms 106 and 107 are employed. As the mechanism is similar to that just described it is not deemed necessary to describe it in detail but it is shown in the drawings.

The foot 113 of each folder-plate 111 is in a horizontal plane while the folder-plates 111 are in vertical planes.

The narrow side flaps having been folded in the manner described while the plunger is at rest during a dwell occasioned by the form of the cam path 82, the continued rotation of the cam carries the plunger farther downward. During this farther descent of the plunger the horizontal triangular folded bottom flaps are folded up outside of the previously folded narrow side flaps as shown in Fig. 18. The means for accomplishing this are as follows, (see Fig. 8:) Two parallel rollers 142 are yieldingly mounted on plates 114 in such manner that they may be spread apart in a similar manner to the folding rollers 50. These two rollers 142 are normally spaced apart so that when the plunger with the lining blank wrapped about it passes down between them the horizontally distending triangular folds of the flaps previously mentioned will be engaged and folded up on the outside of the previously folded narrow side flaps, the rollers being spread apart slightly as the plunger moves down between them. The rollers 142 are journaled in bearings each having a stem 143 which passes through a hole in an extension of the plate 114 and are provided with springs 144 which normally hold the rolls 142 in their operative position. The continued descent of the plunger with the lining blank thus completely folded about it carries the plunger and the lining blank down into the carton properly positioned beneath to receive it. The cartons may be presented and positioned in any suitable way, either by hand or by automatic mechanism as desired but the apparatus is adapted to be used in connection with a machine for setting up the cartons and delivering them from a setting up machine to the above mechanism for inserting the lining and also in connection with a machine for filling the cartons after they are lined. The drawings illustrate suitable mechanism for delivering the set up carton to mechanism for positioning it to receive the lining from the plunger and for then transferring the carton to the filling mechanism. The setting up mechanism and the filling mechanism are omitted from the drawings but there are shown the means for delivering the carton and positioning it and then for transferring it.

A continuously driven belt 146 serves to bring the carton from the setting up mechanism and presenting it to a rotary carrying mechanism or spider 147 which takes the carton and carries it around to a position beneath the plunger block and after it has received the lining the further rotation of the spider carries the lined carton around to again deposit it on the belt 146 on the opposite side from the entrance end whence it is carried to the filling mechanism or other discharge point. This spider 147 is mounted on a rotary shaft 148 which is rotated intermittently making a quarter turn at each period of rotation. The means for rotating the spider intermittently is as follows, (see Figs. 1, 19 and 25:) The lower end of said shaft 148 is stepped in a bracket 149 and the upper end is journaled in a bearing in bracket 150. Mounted fast on said shaft 148 is a disk 151 which has formed in its periphery four notches 152 at equal intervals apart. Projecting from the surface of the said disk 151 are four pins 153 each provided with a roller 154 which at a certain point in the rotation of the disk is adapted to be engaged by the hook end of a connecting rod 155. The other end of said connecting rod 155 is pivoted at 156 to a cam lever 157. Said cam lever 157 is pivoted at one end to a stud 158 projecting from the bracket 150. Mounted on said lever 157 intermediate its ends is a roller 159 which engages a cam 160. Said cam 160 is mounted on rotary shaft 34. Said cam 160 is so formed that at each rotation its engagement with the roller 159 causes the lever 157 to make a full swing forward and back and in so doing gives to the connecting rod 155 a full stroke forward and back. When the said connecting rod 155 moves forward its hook end which engages with one of the rolls 153 on the disk 151 pushes the disk 151 around a quarter turn. A spring 161 is made fast at one end to a bracket 150 and is connected at its other end to said connecting rod 155, the effect of said spring being to always retain the roller 159 in contact with the cam 160 and also to hold the connecting rod 155 in position for its hook end to engage with one of the rolls on disk 151 at the proper time. By reason of the pressure of the spring 161 when the cam 160 continues its rotation after the disk 151 has made its quarter turn the connecting rod 155 will be drawn back into position for the next feeding movement.

Means are provided to positively lock the disk 151 at the end of each quarter turn, said lock being afterward released to permit the next movement at the proper time. Said locking means as shown is as follows:—A lever 162 is pivoted at 163 to the bracket 150 and is formed with a tooth 164 which is adapted to engage successively with the notches 152 in the disk 151. A spring 165 is connected at one end with the lever 162 and is connected at its other end with a rod 166 which in turn is connected with the bracket 150. Said spring 165 holds the lever 162 in position where the tooth 164 is either in one of the notches 152 or is adapted to snap into one of said notches whenever the disk rotates to bring one of the notches into alinement with the tooth and it is so positioned as to make such engagement just at the end of the forward stroke of the connecting rod 155 when it moves the disk 151.

It is important to have the locking tooth 164 disengaged from the notch just before each forward movement of the connecting rod 155. The means shown are as follows: A cam 167 is mounted on shaft 34 and is adapted to engage a roll 168 carried by the lever 162 to turn the lever in a direction to disengage the tooth 164 from the notch 152 at the proper time in the sequence of movements of the parts with relation to the forward stroke of the connecting rod 155.

The mechanism for transferring the unlined carton into position beneath the plunger to receive the lining is as follows, see Figs 1 and 19: The spider 147 is formed with four rotating arms 169 equal distances apart, each of which carries a bracket 170 adjustably attached thereto in such manner that it may be adjusted radially in and out. On the outer end of each of said brackets is mounted a curved rail 171 curved in the arc of a circle so that when the four brackets 170 are adjusted radially the same distance from the center the four curved rails 171 will all form arcs in the same circle. Projecting radially from the said spider 147 are four other arms 172 located alternately with the arms 169 and midway between each pair of arms 169, said arms 172 being also radially adjustable with relation to the center of the spider 147. A right-angled plate 173 is made fast to the outer end of each arm 172, one arm of said plate 173 extending outward toward the circumference of the circle formed by the rails 171 to form one side of a pocket to receive the carton and the other side of said right-angled plate 173 forming the back of the pocket. A plate 174 is hinged at 175 to the back portion of the plate 173 so as to form another side of the pocket, said plate 174 being hinged so that it may be spread open to form a wider mouth for the entrance of the carton into the pocket. A spring 267 around the hinge pin 175 (see Fig. 20) normally retains the hinge plate 174 in a closed position. A curved finger 176 projects from the hinged plate 174 and its heel is adapted to be engaged by the heel of the cam finger 177 projecting from the bracket 178 which is fast to the platen 179. This cam finger 177 is located so as to engage the finger 176 of each pocket just as the pocket is brought to a position of rest over the belt 146 at the entrance point for the carton, this station being marked a. Fig. 19. In so doing the hinged plate 174 is turned so as to spread it away from the side of the pocket formed by the plate 173. Said bracket 178 is formed with a curved slot 180 through which passes a bolt 181 which clamps the bracket in its adjusted position, the curved slot allowing the adjustment of the bracket when the brackets 170 are moved in and out for different size packages. While the spider is in the position of rest one of the cartons on the continuously traveling belts 146 will be carried forward into the pocket and then when the spider begins to turn and the finger 176 rides out of engagement with the cam finger 177, the spring 267 on the hinge pin 175 of the hinged plate 174 will cause the hinge plate to move so as to grip the carton tightly against the opposite side of the pocket and hold the carton in squared-up shape when the spider moves, the bottom of the carton sliding along the platen 179 after it is carried away from the belt 146, said belt 146 being just above the platen 179. When the spider has made a quarter rotation so as to bring the carton around into the next point of rest or station b it is in position beneath the plunger and ready to receive the plunger with the lining wrapped around the plunger. It comes into this position during the movement of the plunger so as to be there in time to receive the plunger.

After the lining has been fully wrapped around the plunger it passes between guides to keep the lining from springing away from the plunger before it enters the carton. The guide mechanism shown is as follows, (see Figs. 1, 10, and 11:) A supporting bracket 182 rises from the base of the machine and supports at its upper end two parallel arms 183 which are adjustable toward and from each other. Suitably mounted on each of the arms 183 are two blocks 184. Each block 184 has secured thereto a right-angled guide plate 185 both branches of each plate standing in vertical planes at right angles to each other. The four guide plates form a skeleton guide for the plunger. The two blocks 184 on each arm 183 are movable toward and from each other to adapt them to plungers of different widths by sliding them on the arms 183 and they are then clamped in their adjusted position by the clamp screws 186. The guide plates 185 are also adjustable toward and from each other to accommodate cartons of different thicknesses by sliding the arms 183 on the bracket 182.

The cartons are usually formed with flaps at the upper end for the purpose of closing the top of the flap after the package has been filled. These flaps are left in an upwardly extending position when the carton comes from the setting up machine and until they have passed through the lining machine and have been filled by the filling machines. It is desirable to have some means for slightly spreading the top flaps before the entrance of the plunger and lining into the carton so that the flaps will not be engaged by the plunger in its descent which would tend to turn the flaps down into the carton. As the cartons are usually constructed two of these top flaps are wider than the other two and are the ones which are most likely to cause the interference. It is not usually necessary to provide this flap spreading mechanism for any except the two wider flaps. The mechanism shown in the drawings for this purpose is as follows, (see Figs. 1 and 10:) A block 187 is secured to the outer face of each of two opposite guide plates 185 and a bearing 188 is secured to each of said blocks 187 in such manner as to be vertically adjustable thereon. The means shown for thus securing it is by a bolt 189 which passes through a vertically elongated slot in the bearing 188 and screws into the block 187. By setting up the bolt 189 the adjustable bearing is securely clamped in its adjusted position. Journaled in the lower end of each of said bearings 188 is a rock-shaft 190 to which is secured a finger 191 which extends into the path of the downwardly extending plunger, the inwardly projecting ends of said fingers being turned downwardly. Rigidly secured to said shaft 190 is an arm 192 to the free end of which is secured one end of a spring 193, the other end of said spring being secured to the bearing 188, the purpose of the springs being to retain the fingers 191 in the position shown in Fig. 10 extending into the path of the plunger. A stop pin 194 engages the upper side of the arm 192 to limit the upward pull of the said arm 192 and of the fingers 191. When the plunger with the lining carried thereon descends it engages the inwardly extending fingers and turns them down thereby turning the rock-shaft 190 and expanding the springs 193 and the curved ends of said fingers 191 will engage the inner faces of two opposite upwardly extending flaps 195 of the carton spreading them slightly outward so as to be clearly out of the way of the plunger in its descent into the carton. When the plunger rises the rounded ends of the fingers will allow it to ride up between the fingers without undue interference. Sometimes when the plunger is withdrawn from the carton the lining clings so closely to the plunger that the plunger has a tendency to withdraw the lining with it instead of leaving it deposited in the carton. Whenever there is any such tendency the fingers 191 will engage the upper end of the lining and hold it from being withdrawn. After the plunger has fully withdrawn from between the fingers 191 the springs 193 will pull the rocking arms 192 and the fingers 191 again into the operative position shown in Fig. 10 for engaging the plunger on its next descent.

After the lining has been inserted while the carton is at the station $b$ and the plunger has withdrawn to its uppermost position the spider will make another quarter turn carrying the carton with the inclosed lining around to the third station indicated by $c$ onto the belt 146 which is on the same level as the top of the platen 179. It is important that the gripping of the pocket upon the carton shall be released at least as soon as the carton reaches the belt so that the carton will be left free to be carried off by the belt. For this purpose mechanism is provided between station $b$ and station $c$ similar to that which opened the hinged side at station $a$.

A bracket 196 secured to the platen 179 and formed with an elongated slot 197 and having a clamping bolt 198 carries a curved finger 199 whose heel is engaged by the heel of the finger 176 projecting from the hinged plate 174 to swing open the hinged plate and thereby free the carton. At the next succeeding movement of the spider when the finger 176 rides off of the finger 199, the spring connected with the hinge will close the hinge plate in the manner previously described, and it will remain closed through the succeeding station $d$ and until it comes around the station $a$.

Occasionally it may happen that the carton by the time it comes around to the position *b* is not in a properly squared out condition to receive the plunger, either by reason of its being imperfectly squared at the time it was received into the pocket at station *a* or by being disarranged at some time subsequently before it reaches station *b*, so that there is not a clear entrance for the plunger, or it may be that the flaps have not been properly spread by the fingers 191 or it may happen that for some reason the disk 151 fails to make an exact quarter turn by turning either too far or too short, or otherwise failed to move the spider so as to bring the carton into proper alinement with the plunger, and therefore the plunger in its descent will strike the top of the carton or descend at one side of the carton and strike the spider, or the lining upon the plunger may have some projecting portions which would engage with the top of the carton so as to interfere with the proper introduction of the lining, or some other imperfect working of the machine might occur to make an obstruction to the proper descent of the plunger with the lining in perfect condition into the carton. Means are provided to form an elastic take-up for the plunger so that in case of such obstruction the plunger will stop its descent while the driving mechanism continues to move. This is done by providing means whereby in case of such obstruction the gear 75 and the rack 73 will be brought to a stand still while the pinion 77 and gear segment 78 moved to the full end of their stroke in the direction for causing the descent of the rack and plunger. The means shown are as follows, (see Figs. 19, 26 and 27:) Shaft 76 is journaled in bearings 201.
Mounted fast on said shaft is a disk 202 formed with a hub 203. The gear 75 is loosely mounted on said hub 203 and is formed with a chamber 204 in to which a pin 205 projects from the disk 202. A clocp spring 207 is made fast to said pin 205 and at its other end it is made fast at 208 to the hub of the gear. The tension of this clock spring 207 is such that when the shaft 76 revolves motion will be transmitted through the spring 207 to the gear 75; the tension of the spring being strong enough so that under normal conditions the resistance given by the rack 73 and the plunger will not prevent the proper transmission of the force to carry the rack and plunger down. If, however, the plunger strikes any obstruction, such for instance as caused in any of the ways already described, the shaft 76 and gear segment 78 will continue to move and instead of the gear 75 being moved the effect will be to wind up tighter the clock spring, while the gear 75 stops its rotation. The gear 75 and the plunger will be brought to a stop in this way yieldingly instead of by a sharp stop and will allow the shaft 76 and the gear segment 78 to move onto the end of their stroke on the return movement of the shaft 76 and the gear segment 78 and the clock spring 207 will unwind without moving the rack 73 until the shaft comes back to the point where the rack and plunger were brought to a standstill and then the continued backward movement of the shaft 76 will raise the rack 73 and the plunger.
A block 209 is secured to the face of the gear 75 and a stop screw 210 is adjustably mounted in said block 209. Said disk 202 is formed with a projection 211 which engages with the end of the stop screw 210 whereby the rotation of the disk 202 causes the rotation of the gear 75. The purpose of making the screw 210 adjustable is to vary the relation of the disk 202 to the gear 75 in order to vary the stopping point of the lower end of the block at its points of rest, that is, there will be a constant length of stroke of the plunger and constant distance between the stopping points of the plunger but the actual points of stopping will be varied.

It is important to provide means for stopping the machine if there is not a carton in proper position to receive the plunger and lining when the plunger descends. If a carton is delivered properly to the pocket of the spider at the station *a* there is practically no doubt at all that in the ordinary operation of the machine the carton will continue to be in the pocket properly positioned when it reaches the station *b* unless there has been some failure to bring the spider to a standstill to properly aline the carton with the plunger, in which case the descent of the plunger will be arrested in the manner already described. Means are therefore provided to stop the machine unless a carton is properly entered into the pocket at the station *a*. The means provided are as follows, (see Figs. 1, 2, 19, 21, 22, 23 and 24). An arm 212 is pivoted on two vertically opposing pins 213 so as to swing horizontally. Said pins are mounted fast in the arms of a bracket 261 which is mounted on tie-rod 262 which is a part of the frame of the machine. One end of the said arm 212 extends transversely of the belt 146 just above the belt 146 and beneath the pocket formed by the plates 173, 174 so that when a carton carried by the belt is moved into the pocket it will engage the said arm 212 and turn it on its pivot. The other end of said arm 212 is provided with a pin 214 which extends beneath a pin 215 which projects from the hub 216 of the arm 217. A rod 218 is pivotally connected at its lower end with said arm 217 and at its upper end it is pivotally connected with an arm 219 made fast to a rocking shaft 220 having its bearing in a bracket 221. Carried by said arm 217 at the opposite end from that to which the rod 218 is connected is a counter weight 222 which very nearly balances the weight of rod 218. An arm 223 is also mounted fast at one end of said rock-shaft 220 and at its other end carries a pin 224 for the purpose to be hereinafter described.

Mounted on shaft 37 is a clutch spool 225 which slides longitudinally on the shaft 37 to make driving connection between shaft 37 and the pulley 38. A shipper 226 engages with the spool 225 to move the spool in well known manner. There is provided a hand lever 227 whereby the spool may be moved in one direction to make the connection and by moving it in the other direction it engages with a collar 228 on the rod 229 to disengage the clutch, said rod 229 being slidable longitudinally in its bearings. A connecting rod 230 is pivotally connected at one end with said shipper rod 229. The other end of said connecting rod 230 is conical and is adapted to be seated in a conical recess in the side of an upturned portion 231 of an arm mounted on the bracket 221. When said clutch is disengaged the said conical end of the rod 230 will be seated in said recess. When the clutch is connected the shipper rod and the connecting rod 230 will be moved longitudinally in such manner as to disengage said rod 230 from the recess in the said arm 231 and in that event the said connecting rod 230 will have a tendency to drop or swing down and will swing down unless it is supported in some other way. A T-shaped rocking lever 232 has one end of one arm of the cross part of the T secured fast on a rocker shaft 233. The other end of the cross part of said T-lever is formed with a projection 234 which is adapted to engage with a collar 235 secured to the connecting rod 230 and does so engage when the connecting rod 230 moves with the shipper rod in a direction to engage the clutch. The other arm of the lever 232 carries a roller 236 which is adapted to engage the cam 83. Secured to said arm of the lever 232 is a downwardly extending arm 237 having a hook end which is adapted to hook under the connecting rod 230 and support the said rod 230 from dropping under certain conditions when the said connecting rod is withdrawn from its seat in the arm 231. The pin 224 also extends beneath said connecting rod 230 and is adapted to support said rod 230 under certain conditions. A spring 238 one end of which is connected with the bracket 221, the other end of which is connected with the T-shaped rocking lever 232, holds the said lever 232 with the roller 236 in constant engagement with the cam 233 but allows the said lever to be rocked when the high part of the cam engages the roll.

If a package is properly entered into the pocket at the station $a$ the operation of the clutch mechanism and the intermediate parts will be as follows: If the machine has previously been out of operation the clutch should be thrown into engagement by means of the hand lever 227 after the carton has been entered into the pocket. The insertion of the carton in the pocket will turn the lever 212 from the position shown in Figs. 19 and 24 so as to turn the pin 214 out from beneath the pin 215 and the connecting rod 230 will, by the same movement of the hand lever which engages the clutch, move shaft 229 so that the conical end of the connecting rod 230 will be disengaged from the seat 231, as shown in Fig. 22. Said connecting rod 230 is now held up, however, in its horizontal position by means of the hook 237. The roller 236 is in engagement with the cam 83 and the cam is in rotation. As soon as the cam rotates around far enough to bring the high part 239 of the cam into engagement with the said roller 236 the T-shaped lever 232 will be rocked up into the position shown in Fig. 21 and the hook end of the arm 237 also will swing down out of engagement with the connecting rod 230 and the weight of the connecting rod and the collar 235 carried thereby pressing down upon the pin 224 will be sufficient to rock the lever 223 down, turning the rock-shaft 220 and lifting the lever 219 thereby raising the connecting rod 218. The dropping of the connecting rod 230 carrying down the collar 235 allows the projection 234 on the lower end of the cross arm of the T-shaped lever 232 to swing free from engagement with the collar 235 so that the clutch rod 229 will still be left in its former position with the clutch in engagement. After the high point 239 of the cam 83 has ridden past the roll 236 the spring 238 will pull the T-shaped lever 232 back into the position shown in Fig. 22 with its mid arm in horizontal position bringing the hook arm 237 again into its vertical position and lifting the connecting rod 230 again into horizontal position. The rod 218 will then drop of its own weight carrying the lever 223 and the pin 224 upward again so that pin 224 is in contact with the under side of rod 230. The operation will continue to be repeated as long as a carton is properly presented to the pocket at the station $a$ at each period of movement. After the spider begins to move so that the carton is carried off of the belt at station $a$ as soon as it moves far enough to disengage the carton from engagement with the lever 212, a spring 240 will turn the lever 212 back into its normal position, as shown in Fig. 19.

Supposing after the machine has once been started by throwing the clutch as previously described, there fails to be a carton entered in the pocket at the station $a$ in that case the lever 212 will remain in its normal position as shown in Fig. 19, with the pin 214 just beneath the pin 215 so that lever 217 cannot turn and therefore the upright connecting rod 218 cannot drop and therefore also the pin 224 on the rocking lever 223 will remain in engagement with the under side of the connecting rod 230. Now when the cam 83 rotates far enough for the high point 239 to rock the T-shaped lever 232 and disengage the hook lever 237 from the connecting rod 230 the pin 224 will still hold the connecting rod 230 in its horizontal position in alinement with its seat in the bracket 231. As the T-shaped lever 232 swings under the actuation of the high point 239 of the cam 83 the projection 234 at the lower end of the cross arm will engage the collar 235 thereby moving the connecting rod 230 and the clutch rod 229 toward the right as viewed in Fig. 22, and this movement together with the further impetus given to it by the spring of the clutch finger 241 will carry the end of the connecting rod 230 into its seat in the bearing 231. This will disengage the clutch and the machine will stop until started again by the hand lever at the will of the operator.

When the side flaps of the lining are folded up against the narrow sides of the plunger the said flaps overlap each other and it is desirable, although not necessary, that the outer or overlapping flaps should be supplied with adhesive on their inner faces near their edges so that when folded they will adhere to the first folded or inner flaps and the lining may more surely be retained in proper form. Mechanism is shown in the drawings whereby such adhesive is applied. It is so applied at the same time that the blank is folded up against the wide side of the plunger but before the flaps are folded. The mechanism shown is as follows, (see Figs. 12, 13 and 14): Two levers 247 are mounted fast at one end on rock-shaft 248 said levers being bent and extending on opposite sides of the plunger 18, that is, said arms extend along side of the narrow sides of the plunger. A shaft 249 extends transversely between the swinging ends of said two levers 247 and is journaled therein. Mounted fast on said shaft 249 are two glue rolls 250 which are adapted to rest upon the upper side of one of the folding rolls 50. When the lining blank is stretched across the upper side of the folding rolls 50 for the plunger to engage the lining blank, said glue rolls 250 will rest upon the upper side of said lining blank, as shown in Fig. 14, said glue rolls 250 being spaced apart the right distance so that they will engage the flat lining blank near its opposite edges. When the plunger descends carrying down the lining blank between the folding rolls 50 it will drag the lining blank along in contact with the glue rolls 250, on the upper face of the blank and the folding rolls on the under face of the blank, both sets of rolls revolving and a narrow strip of glue 265 will be deposited on the upper face of the flap near each edge on that portion of the blank which will form the inner face of the outer flaps $f$ for the narrow sides of the plunger so that at a later stage in the operation when said glued flaps $f, f$, are folded upon the unglued narrow side flaps $e, e$, the glued flaps $f, f$, will be caused to adhere to the first folded narrow flaps $e, e$.

It is important that the glue rolls 250 should not come directly in contact with the folding rolls 50 because that might cause the folding rolls to become sticky and interfere with the operation. It is therefore important that the glue rolls 250 should be lifted just as the lining blank passes out from between the glue rolls and the folding rolls. It is also important to provide means for feeding or applying glue to the glue rolls and this is done while the glue roll is in its withdrawn position. To accomplish both of these objects the shaft 248 is caused to rock so as to swing the levers 247 up to lift the glue rolls 250 out of the way of the folding rolls and also to bring them into engagement with a glue feed roll. A pair of glue feed rolls 251 are mounted on a shaft 252, each of said glue feed rolls dipping into a glue pot 253, during its rotation thereby receiving glue which is fed to the periphery of the glue rolls 250. The means for rocking said shaft 248 so as to carry the levers 247 and the glue rolls 250 into their respective operative positions is as follows: A connecting rod 254 is connected at one end to one of said levers 247, the other end of said connecting rod being pivotally connected with one end of an arm 255 whose other end is made fast to rock shaft 256, said rockshaft being journaled in the frame of the machine. An arm 257 has one end made fast to the said rockshaft 256, the other end of said arm 257 carrying a roll 258 which engages with the periphery of a cam 259 mounted on shaft 31. The rotation of said cam 259 actuates the arm 257 and through the connecting mechanism before described actuates the levers 247 which carry the glue rolls. The cam 259 is so shaped that it will cause the rocking of the glue roll levers 247 at the proper time to lift the glue rolls 250 out of engagement with the lining blank into contact with the glue feed roll where it will dwell for a time and then to rock the glue roll levers again down to bring the glue rolls into contact with the inwardly advanced lining blank after the plunger has made its upstroke. It is desirable to have the cam 259 adjustable so as to vary the length of dwell of the glue roll in its downward position on the lining blank according to varying lengths of lining blanks employed. In order to provide for this it is preferable to make use of a double cam. One form of such double cam is shown in the drawings (see Fig. 13) but it is not deemed necessary to describe the same in detail. In order to give proper adjustment to the roll 258 with relation to the cam 259 said roll 258 is preferably adjustable on the lever 257. To accomplish this the stud 279 on which the roll 258 is mounted passes through an elongated slot 260 being adjustable therein.

If the blank strip has been previously provided with strips of dried gum or other adhesive, as might be done, the rolls 250 may be employed simply as moistening rolls and the glue pot may contain water instead of glue. We regard such a substitution as coming within the scope of our invention. In fact the method of sealing the overlapping flaps of the lining may be varied in many ways and come within the scope of our invention. So far as we are aware we are the first to seal the overlapping flaps of a box lining and we desire to broadly cover such construction by whatever method the sealing is accomplished.

The operation of the machine is as follows: Assume that the strip of paper from which the lining blanks are formed has been properly threaded up through the guides 56 and advanced between the rolls 8, 9, and there is already a previously severed blank positioned over the folding rolls 50, the plunger 18 being at its uppermost position, as shown in Fig. 1. Assume also that cartons have already been introduced into each one of the pockets of the spider at the stations $a$ and $b$, it being unimportant at this stage whether or not there be any carton in the pocket at the station $c$. Now, if the machine is started by throwing the clutch by means of the hand lever 227 the driving shaft 37 will begin to rotate and by means of the intermediate mechanism previously described, the rack bar 73 will begin to descend carrying with it the plunger 18 which will engage the flat lining blank which extends across over the folding rolls 50 and will carry the blank down between the rolls 50. This action will fold the blank flat up against the two broad sides of the plunger 18 and during this folding the glue rolls 250 which will have been in contact with the lining blank when the plunger was at the upper end of its stroke before it started to move down will apply glue on two opposite edges of the lining blank for that portion of the length of the blank which forms the outer flaps $f$, $f$, for the narrow sides. When the plunger carries the blank down between the rolls 50, just after the bottom of the plunger has passed below the rolls 50, it will pass between the guide plates 93 which serve to hold the upright portions of the blank firmly against the side of the plunger until after the plunger begins to descend again to fold the narrow flaps. As soon as the plunger has descended far enough for the said blank to be folded flat against its two broad faces the plunger will dwell by reason of the form of the cam 83, previously mentioned. During this dwell the folder plates 111 will move to fold the two distending flap portions $e$ $e$ of the blank which are turned up on one of the broad faces of the plunger around against the two narrow sides of the plunger and at the same time the triangular feet 113 which are carried by the folder plate 11 will sweep down and across the lower part of said flaps just folded, then the folder plates 127 will sweep forward and down, folding the distending portion $f$, $f$, of the up-turned part of the blank which was folded against the other broad face of the plunger and which has already been glued around the said two opposite narrow sides of the plunger overlapping the narrow side flaps $e$, $e$, just previously folded. While the folder plates 127 are moving to fold the second pair of narrow flaps the folder plates 111 will have moved out of the way. After the two pairs of narrow side flaps have been folded the cam 82 will have revolved far enough so that it will again begin to move the plunger down and in such downward movement the plunger will pass between the folder rolls 142, and the guides plates 155. As the plunger passes down between the rolls 142, said rolls 142 will fold up the three sided, partially folded, laterally extending portions $g$, $g$ which are at the bottom of the plunger up against the just folded narrow flaps. The guide plates 185 will hold the said three sided fold of the lining against springing out during the further descent of the plunger and just before the plunger enters the carton, the fingers 191 will spread the upwardly extending flaps 195 of the carton in the manner previously described, to admit the plunger and the lining which is folded thereon into the carton. On the ascent of the plunger the lining will be left in the carton. During the movement of the plunger the lining strip will be feeding forward and the cutter 7 will have severed the blank which will be carried forward by the feed rools 8, 9, and the feed tapes 10, 11, in the manner previously described, until the advance end strikes against the stop pins 66, said stop pins having been turned down into their stop position during the descent of the plunger and will be released by the upper end of the plunger striking against the collar 72 on the ascent of the plunger so that then the blank may be fed forward into posiiton over the folding rolls 50. When the blank is advanced beneath the plunger after the stop pins 66 are lifted the blank will be fed forward until its advance side strikes against a stop rail 263, said stop rail being slotted along its under side to permit passage of the tapes 10 on their under run. See Figs. 1 and 2. While the plunger is making its ascent after it has completed its down stroke, the spider will make a quarter turn by reason of the quarter turn of the shaft 148 actuated by the hook end of the connecting rod 155 engaging with one of the rolls 154 on the disk 151, and a fresh carton will be brought around into position beneath the plunger.

What we claim is:—

1. In a machine for lining boxes, a reciprocable plunger adapted to fit the interior of the box to be lined, mechanism for folding a lining blank about the plunger, a box carrier adapted to carry boxes to a position in alinement with the path of the plunger, means for actuating the plunger and means for actuating the carrier, and means controlled by the presence of a box in the carrier at a predetermined position in its path of movement to start the plunger actuating mechanism and the carrier actuating mechanism.

2. In a machine for lining boxes, a reciprocating plunger, means for folding a lining blank about the plunger and means actuated by the plunger in its movement to spread the top closing flaps of a carton positioned in alinement with the path of the plunger to receive the lining.

3. In a machine for lining boxes, a reciprocable plunger adapted to fit the interior of the box to be lined, mechanism for folding a lining blank about the plunger, a box carrier adapted to carry boxes to a position in alinement with the path of the plunger, means for actuating the plunger, and means for actuating the carrier controlled by the presence of a box on the box carrier at a predetermined position in its path of movement.

4. In a machine for lining boxes, mechanism for feeding a lining strip from a roll, mechanism for severing a predetermined length from the strip to form a lining blank, a vertically movable plunger, means for actuating the plunger whereby it descends by intermittent movements, means whereby during one of the periods of movement the lining blank is engaged by the plunger and is folded against the bottom and two sides of the plunger, means whereby the plunger is caused to dwell after the said two sides are folded, means for folding the flaps to form the remaining sides of the lining against the remaining two sides of the plunger while the plunger is at rest, means for folding the distended bottom portions of the lining up around the outside of the last folded side flaps, the actuating mechanism for the plunger being so timed that the plunger will have a still further descent after the lining is fully folded about the plunger into a box positioned beneath it, means actuated by the plunger in its descent after the lining is folded to spread the top closing flaps of the carton into which the plunger carries the lining.

5. In a machine for lining boxes, a reciprocable plunger shaped to fit the interior of the box to be lined, mechanism for folding a lining blank about the plunger, an intermittently moving box carrier having box holders at regular intervals apart, means for actuating said box carrier intermittently whereby at each period of rest one of the box holders will be positioned in alinement with the plunger, means for actuating the plunger whereby the plunger with the wrapped lining will be moved into a box in the holder positioned in alinement with the plunger, means for delivering a box to each box holder at one of the periods of rest of the box carrier before it reaches its position in alinement with the plunger and means for starting the carrier and the plunger actuating mechanism controlled by the presence of a box in the box holder at the regular station therefor.

6. In a machine for lining boxes, a pair of feed rolls between which a strip is run from a roll, a second pair of feed rolls spaced apart from said first pair of feed rolls and between which said strip is run from the first pair of feed rolls, driving mechanisms for both pairs of feed rolls, means for so timing said driving mechanisms with relation to each other that the surface speed of the second pair of feed rolls is greater than the surface speed of the first pair of feed rolls, means for severing the strip between the two pairs of feed rolls, a traveling carrier to which the blank severed from the strip is fed by said second pair of feed rolls having an open space which is bridged by the blank, a reciprocable plunger which engages the blank on said carrier and carries it down through said open space and means for folding the blank around the plunger.

7. In a machine for lining boxes, a pair of feed rolls between which a strip is run from a roll, a second pair of feed rolls spaced apart from said first pair of feed rolls and between which said strip is run from the first pair of feed rolls, driving mechanisms for both pairs of feed rolls, means for so timing said driving mechanisms with relation to each other that the surface speed of the second pair of feed rolls is greater than the surface speed of the first pair of feed rolls, means for severing the strip between the two pairs of feed rolls, a traveling carrier to which the blank severed from the strip is fed by said second pair of feed rolls having an open space which is bridged by the blank, means for moving said carrier at a greater surface rate of speed than said second pair of feed rolls, a reciprocable plunger which engages the blank on said carrier and carries it down through said open space and means for folding the blank around the plunger.

8. In a machine for lining boxes, a vertically reciprocable plunger shaped to fit the interior of the box to be lined, means for feeding a lining blank into a position transversely of the path of the plunger, a support for the lining blank having an open space for the passage of the plunger, a gate in the path of the lining blank before it reaches a position in the path of the plunger to check the advance of the blank and means controlled by the plunger to release the gate from the path of the lining blank.

9. In a machine for lining boxes, a vertically reciprocable plunger shaped to fit the interior of the box to be lined, means for feeding a lining into a position transversely of the path of the plunger, a support for the lining blank having an open space for the passage of the plunger, a gate in the path of the lining blank before it reaches its position beneath the plunger to check the advance of the blank, means controlled by the plunger to release the gate and a second stop for the advance end of the blank on the farther side of the path of the plunger.

10. In a machine for lining boxes, a reciprocable plunger on which the lining is to be formed, a support for a lining blank whereby the blank is supported transversely of the path of the plunger, said support having a passage therethrough for the plunger, means for reciprocating said plunger whereby the plunger in its descent engages said lining blank and carries it through the open space in said support, means for folding the blank against the end and two opposite sides of the plunger leaving laterally projecting portions at the end and sides of the plunger, folder plates adapted to engage the said projecting side portions and fold them against two other sides of the plunger, said folder plates having feet at an angle thereto which engage and crease said projecting end portions of the blank.

11. In a machine for lining boxes, a vertically reciprocable plunger shaped to fit the interior of the box to be lined, a support for a lining blank whereby the blank is supported transversely of the path of the plunger, said support having a passage therethrough for the plunger, means for reciprocating said plunger intermittently whereby the plunger in its descent engages said lining blank and is caused to dwell at a level below the support for the lining blank, means for turning up the lining blank on two sides of the plunger in its passage through said support to said lower level of rest, a pair of folder plates parallel with each other in vertical planes spaced apart slightly greater than the thickness of the plunger block at opposite sides of the path of travel of the plunger, means for actuating said folder plates to sweep in a downward curve and engage the projecting side flaps of the lining blank and fold them against the two sides of the plunger at right angles with the two sides against which the blank was first turned up, a second pair of vertical folder plates spaced apart from each other in parallel planes, means for actuating said second pair of folder plates to sweep downward in curves in parallel vertical planes to fold the remaining pair of projecting side flaps outside of said first pair of side flaps, said first pair of vertical parallel plates being formed with feet at right angles to said vertical plates which in the downward sweep crease the bottom flaps of the lining blank.

12. In a machine for lining boxes, a vertically reciprocable plunger shaped to fit the interior of the box to be lined, a support for a lining blank whereby the blank is supported transversely of the path of the plunger, said support having a passage therethrough for the plunger, means for reciprocating said plunger intermittently whereby the plunger in its descent engages said lining blank and is caused to dwell at a level below the support for the lining blank, means for turning up the lining blank on two sides of the plunger in its passage through said support to said lower level of rest, a pair of folder plates parallel with each other in vertical planes spaced apart slightly greater than the thickness of the plunger block at opposite sides of the path of travel of the plunger and means for actuating said folder plates to sweep in a downward curve and engage the projecting side flaps of the lining blank and fold them against the two sides of the plunger at right angles with the two sides against which the blank was first turned up, a second pair of vertical folder plates spaced apart from each other in parallel planes, means for actuating said second pair of folder plates to sweep downward in curves in parallel vertical planes to fold the remaining pair of projecting side flaps outside of said first pair of side flaps, said first pair of vertical parallel plates being formed with feet at right angles to said vertical plates which in the downward sweep crease the bottom flaps of the lining blank, the actuating mechanism for the plunger causing a further descent of the plunger after the dwell during which the said side flaps were folded and means for folding the projecting bottom portions of the lining up outside of the folded side flaps during said further descent of the plunger.

13. In a machine for lining boxes, a reciprocable plunger, means for folding a lining blank against the bottom and two sides of the plunger, a pair of movable folder plates parallel with each other, means for actuating said folder plates to sweep in a downward curve and engage the projecting side flaps of the lining blank and fold them against two opposite sides of the folder plate at right angles with the two sides against which the blank was first turned up, each of said parallel folder plates being formed with feet at an angle thereto which in the downward sweep crease the bottom flaps of the lining blank.

14. In a machine for lining boxes, a rotary box carrier having a series of pockets to hold the boxes to be lined, means for folding a lining and inserting it into the boxes, driven mechanisms for actuating said box carrier and box lining mechanisms. driving mechanism, clutch connection which is normally operative between said driving mechanism and said driven mechanisms, means adapted for disengaging said clutch and means controlled by the presence of a box in any one of said pockets at a certain point in the rotary path of the carrier to render said clutch disengaging mechanisms inoperative.

15. In a machine for lining boxes, a rotary box carrier having a series of pockets to hold the boxes to be lined, means for folding a lining and inserting it into the boxes, driven mechanisms for actuating said box carrier and box lining mechanisms, driving mechanism. clutch connection which is normally operative between said driving mechanism and said driven mechanisms, means for disengaging said clutch and means actuated by the insertion of a box into one of the pockets at a certain point in the path of movement of the pocket to render said clutch disengaging mechanism inoperative.

16. In a machine for lining boxes, a rotary box carrier having a series of pockets to hold the boxes to be lined, means for folding a lining and inserting it into the boxes, driven mechanisms for actuating said box carrier and box lining mechanisms, driving mechanism, clutch connection which is normally operative between said driving mechanism and said driven mechanisms, means for disengaging said clutch, means adapted to operate said clutch disengaging mechanism to disengage the clutch and means actuated by the insertion of a box into one of the pockets at a certain point in the path of movement of the pocket to render said clutch disengaging mechanism inoperative.

17. In a machine for lining boxes, a reciprocable plunger, means for folding a lining blank against the bottom and two sides of the plunger, a pair of movable folder plates parallel with each other, means for actuating said folder plates to sweep in a downward curve and engage the projecting side flaps of the lining blank and fold them against two opposite sides of the plunger at right angles with the two sides against which the blank was first turned up, said parallel folder plates being formed with feet at right angles to said vertical plates which in the downward sweep crease the downward flaps of the lining blank.

18. In a machine for lining boxes, a reciprocable plunger, means for folding a lining blank against the bottom and two sides of the plunger, a pair of movable folder plates parallel with each other, means for actuating said folder plates to sweep in a downward curve and engage the projecting side flaps of the lining blank and fold them against two opposite sides of the plunger at right angles with the two sides against which the blank was first turned up, said parallel folder plates being formed with feet at right angles thereto which in the downward sweep creases the bottom flaps of the lining blank, a second pair of movable folder plates parallel with each other, means for moving said second pair of folder plates to sweep downward in parallel vertical planes to engage and fold the companion pair of side flaps outside of said first pair of folded side flaps and means for controlling the movement of said parallel folding plates whereby one pair is caused to move to fold one pair of side flaps and then withdraw before the other pair of folding plates moves down.

19. In a machine for lining boxes, a ro- said conveyer extending beyond the periphery of said rotary carrier, means wherebey which moves transversely of the path of the boxes moved by said carrier, each end of said conveyer extending beyond the periphery of said rotary carrier, means whereby the boxes are delivered from said conveyer to said carrier at the side where the path of movement of the conveyer is toward the carrier, means whereby the boxes are delivered back to the conveyer at the side where the path of movement of the conveyer is away from the carrier, and means for inserting a lining into the boxes at a station intermediate the point of delivery from said conveyer to said carrier and the point of transfer from said carrier back to the conveyer.

20. In a machine for lining boxes, a rotary carrier having a plurality of pockets around its periphery spaced at regular intervals to receive and move the boxes, a table beneath the carrier to support the bottoms of the boxes in said pockets, means for intermittently rotating said carrier in a stepby-step movement whereby at each period of movement it moves through an arc equal to the distance between said pockets, a continuously traveling box conveyer which extends diametrically beneath said box carrier substantially on a level with said table, means for so adjusting the stations of rest of the box carrier that at each rest two of said pockets on diametrically opposite sides of said carrier will be over said conveyer whereby a box may be delivered from the conveyer to one of the pockets and a box from the opposite pocket may be discharged onto the conveyer and means for inserting a lining at each period of rest into a box in one of the pockets intermediate said two pockets which are over the conveyer.

21. In a machine for lining boxes, a rotary carrier adapted to move boxes at regular intervals apart, a traveling box conveyer which moves transversely of the path of the boxes moved by said carrier, each end of said conveyer extending beyond the periphery of said rotary carrier, means whereby the boxes are delivered from said conveyer to said carrier at the side where the path of movement of the conveyer is toward the carrier, means whereby the boxes are delivered back to the conveyer at the side where the path of movement of the conveyer is away from the carrier, means for inserting a lining into the boxes at a station intermediate the point of delivery from said conveyer to said carrier and the point of transfer from said carrier back to the conveyer, said rotary carrier being provided with a series of box holders each formed with an open front and a hinged side, means for spreading the hinged side away from the opposite side before the holder reaches the station at which the box is received from said conveyer, means for closing the hinged side after it moves past the station for receiving the box and means for again opening the hinged side between the station at which it receives the lining and the discharge to the conveyer.

22. In a machine for lining boxes, a rotary box carrier having a plurality of pockets around its periphery spaced at regular intervals to receive and move the boxes, a table beneath the carrier to support the bottoms of the boxes in said pockets, means for intermittently rotating said carrier in a step-by-step movement whereby at each period of movement it moves through an arc equal to the distance between said pockets, a continuously traveling box conveyer which extends diametrically beneath said box carrier substantially on a level with said table, means for so adjusting the stations of rest of the box carrier that at each rest two of said pockets on diametrically opposite sides of said carrier will be over said conveyer whereby a box may be delivered from the conveyer to one of the pockets and a box from the opposite pocket may be discharged onto the conveyer, means for inserting a lining at each period of rest into a box in one of the pockets intermediate said two pockets which are over the conveyer, each of said pockets being formed with an open front and a hinged side, means for spreading the hinged side away from the other side before the pocket reaches its station of rest at the entrance station above said conveyer, means for closing the hinged side at the next period of movement of the carrier and means for again opening the hinged side between the station at which the box receives its lining and the discharge station over the conveyer.

23. In a machine for lining boxes, a rotary carrier adapted to move boxes at regular intervals apart, a traveling box conveyer which moves transversely of the path of the boxes moved by said carrier, each end of said conveyer extending beyond the periphery of said rotary carrier, means whereby the boxes are delivered from said conveyer to said carrier at the side where the path of movement of the conveyer is toward the carrier, means whereby the boxes are delivered back to the conveyer at the side where the path of movement of the conveyer is away from the carrier, means for inserting a lining into the boxes at a station intermediate the point of delivery from said conveyer to said carrier and the point of transfer from said carrier back to the conveyer, said rotary carrier being provided with a series of box-holders each formed with an open front and a hinged side, means for spreading the hinged side away from the opposite side before the holder reaches the station at which the box is received from said conveyer and means for closing the hinged side after it moves past the station for receiving the box.

24. In a machine for lining boxes, a box carrier, a series of box-holders carried by said carrier, each of said holders having two sides and a back and an open front, one of said sides being hinged to said back whereby it is adapted to be spread out to widen the entrance to said holder, means for normally retaining said hinged side in its closed position and means for inserting a lining into the box at a station in the travel of the carrier while the hinged side is closed.

25. In a machine for lining boxes, a rotary box carrier having a plurality of pockets around its periphery spaced at regular intervals to receive and move the boxes, a table beneath the carrier to support the bottoms of the boxes in said pockets during the movement of the carrier, means for rotating said carrier in a step-by-step movement whereby at each period of movement it moves through an arc equal to the distance between said pockets, means for inserting a lining into each box at one of the stations of rest, driven mechanisms for actuating said box carrier and box lining mechanisms, driving mechanism, clutch connection between said driving mechanism and said driven mechanisms, means for disengaging said clutch which is adapted to be actuated at each rotation of the driven mechanism to disengage the clutch, a lever which projects beneath one of the pockets at one of the stations of rest, mechanism adapted to release said clutch disengaging mechanism controlled by said lever, said lever being in the path of movement of a box into said pocket whereby the insertion of a box into said pocket moves said lever and thereby trips the clutch disengaging mechanism out of operative position.

26. In a machine for lining boxes, a reciprocable plunger adapted to fit the interior of the box to be lined, means for reciprocating said plunger, means for folding a lining sheet around the plunger, a support for a box in alinement with the downward path of the plunger and movable box flap spreading mechanism actuated by the downward movement of the plunger to spread the upwardly extending flaps of the box positioned on said support.

27. In a machine for lining boxes, a rotary box carrier, a series of box-holders carried by said carrier, each of said holders having two sides and a back and an open front, one of said sides being hinged to said back whereby it is adapted to be spread out to widen the entrance to said holder, means for normally retaining said hinged side in its closed position, means for spreading said hinged side at a certain point in its movement, and means for inserting a lining into the box at a station in the travel of the carrier while the hinged side is closed.

28. In a machine for lining boxes, a vertically movable plunger, means for folding a lining sheet around said plunger, a rotary box carrier rotatable in a horizontal plane, means for intermittently rotating said box carrier, a series of box holders carried by said carrier spaced apart at regular intervals whereby at the end of each period of movement of the carrier one of said holders will be in alinement with said plunger, each of said box holders having two sides and a back and an open front, one of said sides being hinged to said back whereby it is adapted to be spread out to widen the entrance to said holder, means for normally retaining said hinged side in its closed position, means for spreading open said hinged side at a certain point in its movement.

29. In a machine for lining boxes, a vertically movable plunger, means for folding a lining sheet around said plunger, a rotary box carrier rotatable in a horizontal plane, means for intermittently rotating said box carrier, a series of box holders carried by said carrier spaced apart at regular intervals whereby at the end of each period of movement of the carrier one of said holders will be in alinement with said plunger, each of said box holders having two sides and a back and an open front, one of said sides being hinged to said back whereby it is adapted to be spread out to widen the entrance to said holder, means for normally retaining said hinged side in its closed position, a cam projection on said hinged side and a cam surface engaged by said cam projection at a certain point in the travel of the carrier to open said hinged side, said means for normally retaining the hinged side in its closed position closing said hinged side when the said cam projection rides off of said cam surface.

30. In a machine for lining boxes, a rotary box carrier, a series of box-holders carried by said carrier, each of said box-holders having two sides and a back and an open front, one of said sides being hinged to said back whereby it is adapted to be spread out to widen the entrance to said holder, means for normally retaining said hinged side in its closed condition, a cam projection on said hinged side and a surface engaged by said cam projection at a certain point in the travel of the carrier to open said hinged side, said hinged side being free to close again after said cam is out of engagement with said engaging surface, and means for inserting a lining into the box at a station in its travel after the hinged side is closed.

31. In a machine for lining boxes, supports for a lining blank spaced apart from each other on which the lining blank rests bridging the space between the said supports, a gluing member which is adapted to rest upon the upper face of the lining blank while said blank rests on said supports, a reciprocable plunger which passes through the space between said supports and engages the lining blank and carries it down through the space between said supports dragging it along under the said gluing member.

32. In a machine for lining boxes, a reciprocable plunger about which a lining blank is adapted to be folded, a support for said blank having an open space bridged by said blank when on said support, the plunger in its movement engaging the lining blank and carrying it through said open space, a movable gluing roll normally held away from the support for the blank, means for moving the gluing roll to bring it into contact with the lining blank while resting on said support whereby a stripe of adhesive will be deposited on the lining blank when the plunger in its descent draws the lining blank through the open space in the support and means for returning the gluing roll to its normal position.

33. In a machine for lining boxes, a reciprocable plunger about which a lining blank is adapted to be folded, a support for said blank having an open space bridged by said blank when on said support, the plunger in its movement engaging the lining blank and carrying it through said open space, a glue feed roll, a movable gluing roll normally held in contact with the glue feed roll, means for moving the gluing roll to bring it into contact with the lining blank while resting on said support whereby a stripe of adhesive will be deposited on the lining blank when the plunger in its descent draws the lining blank through the open space in the support and means for returning the gluing roll to its normal position in contact with the glue feed roll.

34. In a machine for lining boxes, a support for a lining blank having an open space bridged by the lining blank, a movable carrier carrying a glue roll which is adapted to engage the lining blank while said blank rests on said support, and which is normally out of position for such engagement, means for moving the carrier to bring the glue roll into and out of such engaging position, a reciprocable plunger which engages the lining blank and carries it down through the space between said supports, dragging it along in contact with said glue roll, and means for controlling the time of movement of said carrier and the movement of the plunger with relation to each other whereby the carrier will be actuated to move said glue roll into engagement with the blank while the blank is on said support.

35. In a machine for lining boxes, a support for a lining blank having an open space bridged by the lining blank, and a glue feed roll with which the gluing roll engages when it is in its normal position away from the blank, a movable carrier carrying a glue roll which is adapted to engage the lining blank while said blank rests on said support, and which is normally out of position for such engagement, means for moving the carrier to bring the gle roll into and out of such engaging position, a reciprocable plunger which engages the lining blank and carries it down through the space between said supports, dragging it along in contact with said glue roll, and means for controlling the time of movement of said carrier and the movement of the plunger with relation to each other whereby the carrier will be actuated to move said glue roll into engagement with the blank while the blank is on said support.

36. A plunger, means for folding a lining about the plunger, means for holding a carton with an open end in alinement with the plunger, said open end having flaps adapted to close the end, flap-spreading mechanism, and means, including the plunger, controlling the operation of the flap spreading mechanism, whereby the flap spreading mechanism will spread the flaps at the mouth of the carton outwardly before the plunger enters the said mouth.

In testimony whereof we affix our signatures, in presence of two witnesses.

EVERETT O. HILLER.
WILLIAM A. JOPLIN.

Witnesses:
WILLIAM A. COPELAND.
ALICE H. MORRISON.